US012669680B2

(12) United States Patent
Yu

(10) Patent No.: US 12,669,680 B2
(45) Date of Patent: Jun. 30, 2026

(54) CAMERA OPTICAL LENS

(71) Applicant: AAC OPTICS (CHANGZHOU) CO., LTD., Changzhou City (CN)

(72) Inventor: Renlong Yu, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 376 days.

(21) Appl. No.: 18/324,185

(22) Filed: May 26, 2023

(65) Prior Publication Data

US 2024/0159989 A1    May 16, 2024

(30) Foreign Application Priority Data

Nov. 14, 2022    (CN) ........................ 202211422170.X

(51) Int. Cl.
G02B 9/60 (2006.01)
G02B 13/00 (2006.01)
G02B 13/18 (2006.01)
(52) U.S. Cl.
CPC ............. G02B 9/60 (2013.01); G02B 13/008 (2013.01); G02B 13/18 (2013.01)
(58) Field of Classification Search
CPC ...... G02B 9/60; G02B 13/0045; G02B 13/18; G02B 3/04; G02B 13/008

USPC .......................................................... 359/714
See application file for complete search history.

(56) References Cited

U.S. PATENT DOCUMENTS

2013/0265650 A1* 10/2013 Chen ........................ G02B 9/60
359/714

FOREIGN PATENT DOCUMENTS

CN 113687498 A * 11/2021 ............... G02B 1/00
* cited by examiner

*Primary Examiner* — Jessica M Merlin
(74) *Attorney, Agent, or Firm* — Viersch Law Group

(57) ABSTRACT

A camera optical lens includes, from an object side to an image side: a first lens having positive refractive power; a second lens having positive refractive power; a third lens having negative refractive power; a fourth lens having positive refractive power; and a fifth lens having positive refractive power. The first lens is made of glass material. At least one of the second, third, fourth and fifth lenses is made of glass material. Working temperature of the camera optical lens ranges from −40° C. to 105° C. The camera optical lens satisfies following conditions: $1.50 \leq TTL/f \leq 4.00$; $1.70 \leq n1 \leq 2.20$; and $R3/R4 \leq -2.00$, f denotes a focal length of the camera optical lens; TTL denotes a total optical length; n1 denotes a refractive index of the first lens; R3 denotes a central curvature radius of an object-side surface of the second lens, and R4 denotes a central curvature radius of an image-side surface of the second lens.

9 Claims, 19 Drawing Sheets

CAMERA OPTICAL LENS

TECHNICAL FIELD

The present disclosure relates to the technical field of optical lens and, in particular, to a camera optical lens suitable for handheld terminal devices such as smart phones or digital cameras, and imaging devices such as monitors, PC lenses or vehicle-mounted lenses.

BACKGROUND

With the rise of various smart devices in recent years, the demand for miniature camera optical lenses is continuously increasing, and since the pixel size of the photo sensors become smaller, along with the current development trend of electronic products that requires better performance such as thinner and smaller dimensions and portability, miniature camera optical lenses with good imaging quality therefore have become a mainstream in the market. In order to obtain better imaging quality, a structure with multiple lenses is generally used. Moreover, with development of technology and increase in diversified requirements of users, a camera lens constituted by five lenses gradually appears in camera lens design, in case that pixel area of the photosensitive device is continuously reduced and requirements on imaging quality is continuously increased. A long-focus camera optical lens having good optical performance, small volume and full correction of aberrations is urgently needed.

SUMMARY

In view of the above problems, the present disclosure provides a camera optical lens, which has good optical performance while meeting the design requirements of large aperture, long focal length and small distortion.

Embodiments of the present disclosure provide a camera optical lens, including from an object side to an image side: a first lens having positive refractive power; a second lens having positive refractive power; a third lens having negative refractive power; a fourth lens having positive refractive power; and a fifth lens having refractive power. The first lens is made of a glass material, and at least one of the second lens, the third lens, the fourth lens, and the fifth lens is made of a glass material. A working temperature of the camera optical lens ranges from $-40°$ C. to $105°$ C. The camera optical lens satisfies following conditions: $1.50 \leq TTL/f \leq 4.00$; $1.70 \leq n1 \leq 2.20$; and $R3/R4 \leq -2.00$, where f denotes a focal length of the camera optical lens; TTL denotes a total optical length from an object-side surface of the first lens to an image plane of the camera optical lens along an optic axis; n1 denotes a refractive index of the first lens; R3 denotes a central curvature radius of an object-side surface of the second lens, and R4 denotes a central curvature radius of an image-side surface of the second lens.

As an improvement, the camera optical lens satisfies a following condition: $1.70 \leq n4 \leq 2.20$, where n4 denotes a refractive index of the fourth lens.

As an improvement, the camera optical lens satisfies a following condition: $(R9+R10)/(R9-R10) \geq 1.50$, where R9 denotes a central curvature radius of an object-side surface of the fifth lens, and R10 denotes a central curvature radius of an image-side surface of the fifth lens.

As an improvement, the camera optical lens satisfies a following condition: $5.00 \leq |f3/d5| \leq 10.00$, where f3 denotes a focal length of the third lens; and d5 denotes an on-axis thickness of the third lens.

As an improvement, a working wavelength of the camera optical lens ranges from 905 nm to 975 nm.

As an improvement, the camera optical lens satisfies following conditions: $0.63 \leq f1/f \leq 20.19$; $-7.72 \leq (R1+R2)/(R1-R2) \leq 44.20$; and $0.05 \leq d1/TTL \leq 0.38$, where f1 denotes a focal length of the first lens, R1 denotes a central curvature radius of an object-side surface of the first lens; R2 denotes a central curvature radius of an image-side surface of the first lens; and d1 denotes an on-axis thickness of the first lens.

As an improvement, an object-side surface of the second lens is convex in a paraxial region, and an image-side surface of the second lens is convex in a paraxial region; the camera optical lens satisfies following conditions: $0.64 \leq f2/f \leq 4.33$; and $0.02 \leq d3/TTL \leq 0.11$, where f2 denotes a focal length of the second lens; and d3 denotes an on-axis thickness of the second lens.

As an improvement, an object-side surface of the third lens is concave in a paraxial region, and an image-side surface of the third lens is convex in a paraxial region; the camera optical lens satisfies following conditions: $-2.72 \leq f3/f \leq 0.55$; $-5.60 \leq (R5+R6)/(R5-R6) \leq 0$; and $0.02 \leq d5/TTL \leq 0.13$, where f3 denotes a focal length of the third lens; R5 denotes a central curvature radius of an object-side surface of the third lens; R6 denotes a central curvature radius of an image-side surface of the third lens; and d5 denotes an on-thickness of the third lens.

As an improvement, an image-side surface of the fourth lens is convex in a paraxial region; the camera optical lens satisfies following conditions: $0.29 \leq f4/f \leq 3.34$; $0.13 \leq (R7+R8)/(R7-R8) \leq 4.78$; and $0.06 \leq d7/TTL \leq 0.32$, where f4 denotes a focal length of the fourth lens; R7 denotes a central curvature radius of an object-side surface of the fourth lens; R8 denotes a central curvature radius of an image-side surface of the fourth lens; and d7 denotes an on-axis thickness of the fourth lens.

As an improvement, an object-side surface of the fifth lens is convex in a paraxial region, and an image-side surface of the fifth lens is concave in the paraxial region; the camera optical lens satisfies following conditions: $-2.11 \leq f5/f \leq 8.85$; and $0.02 \leq d9/TTL \leq 0.19$, where f5 denotes a focal length of the fifth lens; and d9 denotes an on-axis thickness of the fifth lens.

The present disclosure has following beneficial effects: the camera optical lens according to the present disclosure has excellent optical performance and has features of large aperture, long focal length and small distortion, which is especially suitable for vehicle-mounted camera lens components composed of high-pixel CCD, CMOS and other imaging elements and WEB camera lens.

BRIEF DESCRIPTION OF DRAWINGS

Many aspects of the exemplary embodiments may be better understood with reference to following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to better illustrate the objectives, technical solutions and advantages of the present disclosure, the present disclosure will be described in further detail below with reference to the accompanying drawings and embodiments. It should be understood that the specific embodiments described herein are only used to explain the present disclosure but are not used to limit the present disclosure.

Embodiment 1

Figure 1:
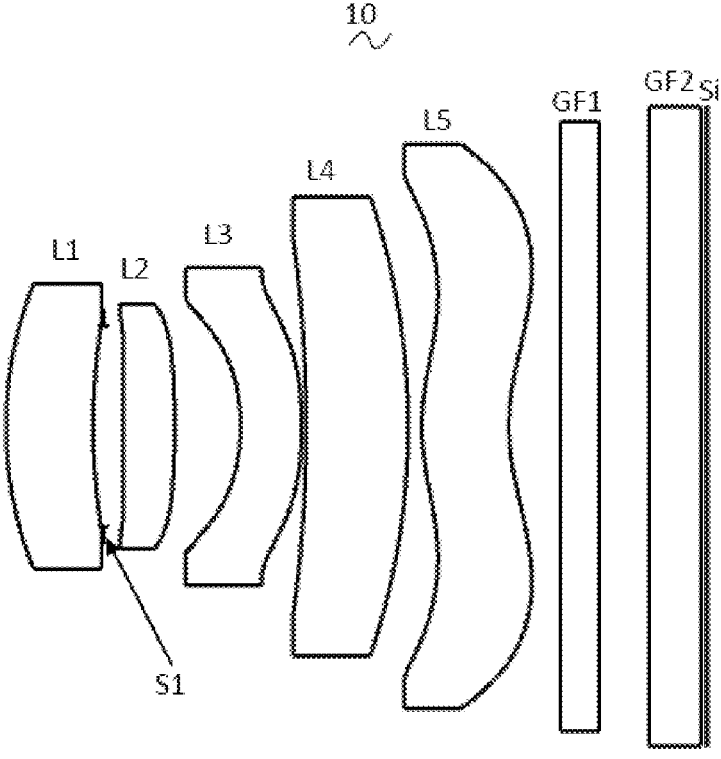
FIG. 1 is a structural schematic diagram of a camera optical lens according to Embodiment 1 of the present disclosure.

Referring to FIG. 1, the present disclosure provides a camera optical lens 10. FIG. 1 shows a camera optical lens 10 according to Embodiment 1 of the present disclosure. The camera optical lens 10 includes five lenses. The camera optical lens 10 includes, from an object side to an image side, a first lens L1, an aperture S 1, a second lens L2, a third lens L3, a fourth lens L4, and a fifth lens L5. An optical element such as an optical filter GF may be arranged between the fifth lens L5 and an image plane Si. In this embodiment, two optical filters GF1, GF2 are included.

In this embodiment, the first lens L1 is made of a glass material, the second lens L2 is made of a plastic material, the third lens L3 is made of a plastic material, the fourth lens L4 is made of a glass material, and the fifth lens L5 is made of a plastic material. The appropriate selection of glass lens can improve the optical performance of the camera optical lens, and meanwhile can make the system work stably under extremely cold or hot working temperatures. In order to ensure its excellent imaging quality, the operating temperature ranges from −40° C. to 105° C. In other embodiments, the lenses also can be made of other materials.

The object-side surface and image-side surface of the first lens L1 and the object-side surface and image-side surface of the fourth lens L4 are spherical surface, and other lenses are aspheric lenses. The surfaces of part of lenses are designed as spherical surfaces, which can reduce the manufacturing difficulty. An operating wavelength of the camera optical lens 10 ranges from 905 nm to 975 nm.

A focal length of the camera optical lens 10 is defined as f, and a total optical length from an object-side surface of the first lens to an image plane of the camera optical lens 10 along an optic axis is defined as TTL. A following condition is satisfied: $1.50 \leq TTL/f \leq 4.00$, which specifies a ratio of the total optical length of the camera optical lens 10 to the focal length of the camera optical lens 10. Within the range of the above condition, the total length of the camera optical lens can be effectively controlled while correcting aberration to ensure imaging quality.

A refractive index of the first lens is defined as n1. A following condition is satisfied: $1.70 \leq n1 \leq 2.20$, which specifies the range of the refractive index of the first lens. A system meeting the above conditions can effectively correct the chromatic aberration, so that the chromatic aberration satisfies $|LC| \leq 1.2$ μm.

A central curvature radius of the object-side surface of the second lens L2 is defined as R3, and a central curvature radius of the image-side surface of the second lens L2 is defined as R4. A following condition is satisfied: $R3/R4 \leq 2.00$, which specifies the shape of the second lens L2. Within the range of the above condition, it is beneficial to alleviating the deflection degree of light passing through the lens and effectively reducing the sensitivity of the camera optical lens.

A refractive index of the fourth lens is defined as n4. A following condition is satisfied: $1.70 \leq n4 \leq 2.20$, which specifies the range of refractive index of the fourth lens. Within the range of the above condition, the chromatic aberration can be corrected effectively.

A central curvature radius of an object-side surface of the fifth lens L5 is defined as R9, and a central curvature radius of an image-side surface of the fifth lens L5 is defined as R10. A following condition is satisfied: $(R9+R10)/(R9-R10) \geq 1.50$, which specifies the shape of the fifth lens. Within the range of the above condition, it is beneficial to correcting the astigmatism and distortion of the camera optical lens, so that $|Distortion| \leq 6\%$, thereby reducing the possibility of generating dark corners.

A focal length of the third lens L3 is defined as f3, and an on-axis thickness of the third lens L3 is defined as d5. A following condition is satisfied: $5.00 \leq |f3/d5| \leq 10.00$, which specifies an absolute value of a ratio of the focal length of the third lens to the on-axis thickness of the third lens L3. Within the range of the above condition, it is beneficial to achieving the ultra-thinness.

In this embodiment, an object-side surface of the first lens L1 is convex in a paraxial region, and an image-side surface of the first lens L1 is concave in the paraxial region. The first lens L1 has a positive refractive power. In other embodiments, the object-side surface and image-side surface of the first lens L1 may also have other concave and convex shapes in the paraxial region.

A focal length of the first lens L1 is defined as f1. A following condition is satisfied: $0.63 \leq f1/f \leq 20.19$, which specifies a ratio of the focal length f1 of the first lens L1 to the focal length of the camera optical lens 10. Within the range of the above condition, it is beneficial to achieving ultra-wide angle. Optionally, a following condition is satisfied: $1.01 \leq f1/f \leq 16.15$.

A central curvature radius of the object-side surface of the first lens L1 is defined as R1, and a central curvature radius of the image-side surface of the first lens L1 is R2. A following condition is satisfied: $-7.72 \leq (R1+R2)/(R1-R2) \leq 44.20$, which specifies the shape of the first lens L1. Within the range of the above condition, it is beneficial to achieving ultra-wide angle. Optionally, a following condition is satisfied: $-4.82 \leq (R1+R2)/(R1-R2) \leq 35.36$.

An on-axis thickness of the first lens L1 is defined as d1, and a total optical length from an object-side surface of the first lens to an image plane of the camera optical lens 10 along an optic axis is defined as TTL. A following condition is satisfied: $0.05 \leq d1/TTL \leq 0.38$. Within the range of the above condition, it is beneficial to achieving miniaturization. Optionally, a following condition is satisfied: $0.08 \leq d1/TTL \leq 0.30$.

In this embodiment, an object-side surface of the second lens L2 is convex in a paraxial region, and an image-side surface of the second lens L2 is concave in the paraxial region. The second lens L2 has a positive refractive power. In other embodiments, the object-side surface and image-side surface of the second lens L2 may also have other concave and convex shapes in the paraxial region.

In this embodiment, a focal length of the camera optical lens 10 is defined as f, and a focal length of the second lens L2 is defined as f2. A following condition is satisfied: $0.64 \leq f2/f \leq 4.33$, which specifies a ratio of the focal length f2 of the second lens L2 to the focal length of the camera optical lens 10. Within the range of the above condition, the field curvature of the system can be effectively balanced. Optionally, a following condition is satisfied: $1.03 \leq f2/f \leq 3.47$.

An on-axis thickness of the second lens L2 is defined as d3, and a total optical length from an object-side surface of the first lens to an image plane of the camera optical lens 10 along an optic axis is defined as TTL. A following condition is satisfied: $0.02 \leq d3/TTL \leq 0.11$. Within the range of the above condition, it is beneficial to achieving miniaturization. Optionally, a following condition is satisfied: $0.04 \leq d3/TTL \leq 0.09$.

In this embodiment, an object-side surface of the third lens L3 is concave in a paraxial region, and an image-side surface of the third lens L3 is convex in the paraxial region. The third lens L3 has a negative refractive power. In other embodiments, the object-side surface and image-side surface of the third lens L3 may also have other concave and convex shapes in the paraxial region.

A focal length of the optical lens 10 of the camera is defined as f, and a focal length of the third lens L3 is defined as f3. A following condition is satisfied: $-2.72 \leq f3/f \leq -0.55$. The optical focal length is controlled reasonably, so that the system has better imaging quality and lower sensitivity. Optionally, a following condition is satisfied: $-1.70 \leq f3/f \leq -0.68$.

A central curvature radius of the object-side surface of the third lens L3 is defined as R5, and a central curvature radius of the image-side surface of the third lens L3 is defined as R6. A following condition is satisfied: $-5.60 \leq (R5+R6)/(R5-R6) \leq 0$, which specifies the shape of the third lens L3. Within the range of the above condition, the deflection degree of light can be reduced and the chromatic aberration can be corrected effectively. Optionally, a following condition is satisfied: $-3.50 \leq (R5+R6)/(R5-R6) \leq 0$.

An on-axis thickness of the third lens L3 is defined as d5, and a total optical length from an object-side surface of the first lens to an image plane of the camera optical lens 10 along an optic axis is defined as TTL. A following condition is satisfied: $0.02 \leq d5/TTL \leq 0.13$. Within the range of the above condition, it is beneficial to achieving miniaturization. Optionally, a following condition is satisfied: $0.03 \leq d5/TTL \leq 0.10$.

In this embodiment, an object-side surface of the fourth lens L4 is concave in a paraxial region, and an image-side surface of the fourth lens L4 is convex in the paraxial region. The fourth lens L4 has a positive refractive power. In other embodiments, the object-side surface and image-side surface of the fourth lens L4 may also have other concave and convex shapes in the paraxial region.

A focal length of the camera optical lens 10 is defined as f, and a focal length of the fourth lens L4 is defined as f4. A following condition is satisfied: $0.29 \leq f4/f \leq 3.34$. The optical focal length is controlled reasonably, so that the system has better imaging quality and lower sensitivity. Optionally, a following condition is satisfied: $0.46 \leq f4/f \leq 2.67$.

A central curvature radius of an object-side surface of the fourth lens L4 is defined as R7, and a central curvature radius of an image-side surface of the fourth lens L4 is defined as R8. A following condition is satisfied: $0.13 \leq (R7+R8)/(R7-R8) \leq 4.78$, which specifies the shape of the fourth lens. Within the range of the above condition, it is beneficial to correcting the astigmatism and distortion of the camera optical lens 10, so that |Distortion|$\leq 35.0\%$, thereby reducing the possibility of generating dark corners. Optionally, a following condition is satisfied: $0.20 \leq (R7+R8)/(R7-R8) \leq 3.82$.

An on-thickness of the fourth lens L4 is defined as d7, and a total optical length from an object-side surface of the first lens to an image plane of the camera optical lens 10 along an optic axis is defined as TTL. A following condition is satisfied: $0.06 \leq d7/TTL \leq 0.32$. Within the range of the above condition, it is beneficial to achieving miniaturization. Optionally, a following condition is satisfied: $0.10 \leq d7/TTL \leq 0.26$.

In this embodiment, an object-side surface of the fifth lens L5 is convex in a paraxial region, and an image-side surface of the fifth lens L5 is concave in the paraxial region. The fifth lens L5 has a positive refractive power. In other embodiments, the object-side surface and image-side surface of the fifth lens L5 may also have other concave and convex shapes in the paraxial region, and the fifth lens L5 may also have a negative refractive power.

A focal length of the camera optical lens 10 is defined as f, and a focal length of the fifth lens L5 is defined as f5. A following condition is satisfied: $-2.11 \leq f5/f \leq 8.85$. The limitation of the fifth lens L5 can effectively make the camera optical lens 10 have a gentle light angle and reduce the tolerance sensitivity. Optionally, a following condition is satisfied: $-1.32 \leq f5/f \leq 7.08$.

An on-axis thickness of the fifth lens L5 is defined as d9, and a total optical length from an object-side surface of the first lens to an image plane of the camera optical lens 10 along an optic axis is defined as TTL. A following condition is satisfied: $0.02 \leq d9/TTL \leq 0.19$. Within the range of the above condition, it is beneficial to achieving miniaturization. Optionally, a following condition is satisfied: $0.04 \leq d9/TTL \leq 0.15$.

In this embodiment, a field of view of the camera optical lens 10 in a diagonal direction is defined as FOV. A following condition is satisfied: $FOV \geq 65.00°$, so that it is 7
8 beneficial to achieving a wide angle. Optionally, a following condition is satisfied: FOV≥66.00°.

In this embodiment, an image height of the camera optical lens 10 is defined as IH, and a total optical length from an object-side surface of the first lens to an image plane of the camera optical lens 10 along an optic axis is defined as TTL. A following condition is satisfied: TTL/IH≤5.60, it is beneficial to achieving miniaturization. Optionally, a following condition is satisfied: TTL/IH≤5.40.

In this embodiment, the F number FNO of the camera optical lens 10 is smaller than or equal to 2.27, so that large aperture is achieved, thereby obtaining good imaging performance of the camera optical lens. Optionally, the F number FNO of the camera optical lens 10 is smaller than or equal to 2.22.

The camera optical lens 10 has good optical performance while meeting the design requirements of large aperture, wide angle and ultra-thinness. According to properties of the camera optical lens 10, the camera optical lens 10 is especially suitable for vehicle-mounted lens, mobile phone camera lens components and WEB camera lens that are composed of high-pixel CCD, CMOS and other imaging elements, respectively.

The camera optical lens 10 of the present disclosure will be described below with examples. The symbols recorded in each example will be described as follows. The focal length, on-axis distance, central curvature radius, on-axis thickness, inflection point, and arrest point are each in unit of millimeter (mm).

TTL denotes a total optical length (on-axis distance from the object-side surface of the first lens L1 to the image plane Si), with a unit of millimeter (mm).

F number FNO denotes a ratio of an effective focal length of the camera optical lens to an entrance pupil diameter.

Optionally, the object-side surface and/or the image-side surface of the lens may be provided with inflection points and/or arrest points in order to meet high-quality imaging requirements. The description below may be referred to in specific embodiments as follows.

Design data of the camera optical lens 10 according to Embodiment 1 of the present disclosure are shown in Tables 1 and 2.

TABLE 1

|  | R |  | d |  | nd |  | vd |
| --- | --- | --- | --- | --- | --- | --- | --- |
| S1 | ∞ | d0= | −0.754 |  |  |  |  |
| R1 | 2.486 | d1= | 0.675 | nd1 | 2.1499 | v1 | 18.31 |
| R2 | 4.225 | d2= | 0.230 |  |  |  |  |
| R3 | 19.791 | d3= | 0.400 | nd2 | 1.6613 | v2 | 20.37 |
| R4 | −9.896 | d4= | 0.510 |  |  |  |  |
| R5 | −1.396 | d5= | 0.474 | nd3 | 1.6613 | v3 | 20.37 |
| R6 | −2.948 | d6= | 0.035 |  |  |  |  |
| R7 | −8.860 | d7= | 0.789 | nd4 | 2.1499 | v4 | 18.31 |
| R8 | −4.626 | d8= | 0.106 |  |  |  |  |
| R9 | 1.385 | d9= | 0.674 | nd5 | 1.5370 | v5 | 55.99 |
| R10 | 1.382 | d10= | 0.400 |  |  |  |  |
| R11 | ∞ | d11= | 0.300 | ndg1 | 1.5233 | vg1 | 54.52 |
| R12 | ∞ | d12= | 0.386 |  |  |  |  |
| R13 | ∞ | d13= | 0.400 | ndg2 | 1.5168 | vg2 | 64.16 |
| R14 | ∞ | d14= | 0.044 |  |  |  |  |

The reference signs are explained as follows.
S1: aperture;
R: central curvature radius of an optical surface;
R1: central curvature radius of the object-side surface of the first lens L1;
R2: central curvature radius of the image-side surface of the first lens L1;

R3: central curvature radius of the object-side surface of the second lens L2;
R4: central curvature radius of the image-side surface of the second lens L2;
R5: central curvature radius of the object-side surface of the third lens L3;
R6: central curvature radius of the image-side surface of the third lens L3;
R7: central curvature radius of the object-side surface of the fourth lens L4;
R8: central curvature radius of the image-side surface of the fourth lens L4;
R9: central curvature radius of the object-side surface of the fifth lens L5;
R10: central curvature radius of the image-side surface of the fifth lens L5;
R11: central curvature radius of the object-side surface of the optical filter GF1;
R12: central curvature radius of the image-side surface of the optical filter GF1;
R13: central curvature radius of the object-side surface of the optical filter GF2;
R14: central curvature radius of the image-side surface of the optical filter GF2;
d: on-axis thickness of a lens and an on-axis distance between lenses;
d0: on-axis distance from the aperture S1 to the object-side surface of the third lens L3;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the image-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the optical filter GF;
d11: on-axis thickness of the optical filter GF1;
d12: on-axis distance from the image-side surface of the optical filter GF1 to the object-side surface of the optical filter GF2;
d13: on-axis thickness of the optical filter GF2;
d14: on-axis distance from the image-side surface of the optical filter GF2 to the image plane Si;
nd: refractive index of a d-line (the d-line is green light with a wavelength of 550 nm);
nd1: refractive index of the d-line of the first lens L1;
nd2: refractive index of the d-line of the second lens L2;
nd3: refractive index of the d-line of the third lens L3;
nd4: refractive index of the d-line of the fourth lens L4;
nd5: refractive index of the d-line of the fifth lens L5;
ndg1: refractive index of the d-line of the optical filter GF1;
ndg2: refractive index of the d-line of the optical filter GF2;
vd: Abbe number;

v1: Abbe number of the first lens L1;
v2: Abbe number of the second lens L2;
v3: Abbe number of the third lens L3;
v4: Abbe number of the fourth lens L4;
v5: Abbe number of the fifth lens L5;
vg1: Abbe number of the optical filter GF1;
vg2: Abbe number of the optical filter GF2.

Table 2 shows aspheric surface data of each lens in the camera optical lens 10 according to Embodiment 1 of the present disclosure.

TABLE 2

| | Conic coefficient | Aspheric coefficient | | | | |
|---|---|---|---|---|---|---|
| | k | A4 | A6 | A8 | A10 | A12 |
| R3 | 1.9825E+02 | −3.5138E−02 | −2.0978E−01 | 1.9804E+00 | −1.3188E+01 | 5.1908E+01 |
| R4 | 3.9895E+01 | −1.1955E−01 | 1.0460E−01 | −1.1681E+00 | 3.9765E+00 | −8.4655E+00 |
| R5 | −9.1876E−01 | −4.0093E−01 | 4.1091E−01 | −1.0690E+00 | 2.3041E+00 | −4.9765E+00 |
| R6 | 1.3666E+00 | −4.9161E−01 | 1.0481E+00 | −2.5686E+00 | 5.6513E+00 | −8.9589E+00 |
| R9 | −7.2405E+00 | −8.3993E−02 | −1.7700E−01 | 3.2069E−01 | −2.8631E−01 | 1.6101E−01 |
| R10 | −1.0343E+00 | −2.5208E−01 | 6.3914E−02 | 2.9965E−02 | −5.0149E−02 | 3.0355E−02 |

| | Conic coefficient | Aspheric coefficient | | | |
|---|---|---|---|---|---|
| | k | A14 | A16 | A18 | A20 |
| R3 | 1.9825E+02 | −1.2790E+02 | 1.9197E+02 | −1.6138E+02 | 5.8254E+01 |
| R4 | 3.9895E+01 | 9.6039E+00 | −3.6368E+00 | −2.5747E+00 | 2.0988E+00 |
| R5 | −9.1876E−01 | 1.1998E+01 | −1.6979E+01 | 1.1625E+01 | −3.0462E+00 |
| R6 | 1.3666E+00 | 9.6680E+00 | −6.5096E+00 | 2.4348E+00 | −3.8596E−01 |
| R9 | −7.2405E+00 | −5.8429E−02 | 1.3117E−02 | −1.6378E−03 | 8.6298E−05 |
| R10 | −1.0343E+00 | −1.0642E−02 | 2.2600E−03 | −2.7224E−04 | 1.4402E−05 |

For convenience, the aspheric surfaces of each lens use the aspheric surfaces shown in condition (1) below. However, the present disclosure is not limited to the polynomial form of aspheric surfaces represented by a condition (1).

$$z=(cr^2)/\{1+[1-k+1)(c^2r^2)]^{1/2}\}+A4r^4+A6r^6+A8r^8+$$
$$A10r^{10}+A12r^{12}+A14r^{14}+A16r^{16}+A18r^{18}+A20r^{20} \quad (1)$$

Here, k denotes a conic coefficient, and A4, A6, A8, A10, A12, A14, A16, A18, and A20 each denote an aspheric coefficient, respectively, c denotes an curvature at a center of an optical surface, r denotes a vertical distance between a point on a curve of the aspheric surface and the optical axis, and Z denotes an aspheric depth (i.e., a vertical distance between a point of the aspheric surface from which a distance to the optical axis is r, and a tangent plane tangent to a vertex on an aspheric optical axis).

Design data of the inflection point and the arrest point of each lens in the camera optical lens 10 according to Embodiment 1 of the present disclosure are shown in Tables 3 and 4. Here, P1R1 and P1R2 denote the object side surface and image side surface of the first lens L1, respectively. P2R1 and P2R2 denote the object side surface and image side surface of the second lens L2, respectively. P3R1 and P3R2 denote the object side surface and image side surface of the third lens L3, respectively. P4R1 and P4R2 denote the object side surface and image side surface of the fourth lens L4, respectively. P5R1 and P5R2 denote the object side surface and image side surface of the fifth lens L5, respectively. Data in an "inflection point" column are a vertical distance from an inflexion point provided on a surface of each lens to the optical axis of the camera optical lens 10. Data in an "arrest point" column are a vertical distance from an arrest point provided on the surface of each lens to the optical axis of the camera optical lens 10.

TABLE 3

| | Number of inflection points | Inflection point 1 | Inflection point 2 |
|---|---|---|---|
| P1R1 | 0 | / | / |
| P1R2 | 0 | / | / |
| P2R1 | 1 | 0.305 | / |
| P2R2 | 0 | / | / |
| P3R1 | 1 | 0.815 | / |

TABLE 3-continued

| | Number of inflection points | Inflection point 1 | Inflection point 2 |
|---|---|---|---|
| P3R2 | 1 | 0.825 | / |
| P4R1 | 0 | / | / |
| P4R2 | 0 | / | / |
| P5R1 | 2 | 0.465 | 1.645 |
| P5R2 | 2 | 0.555 | 1.965 |

TABLE 4

| | Number of arrest points | Arrest point 1 |
|---|---|---|
| P1R1 | 0 | / |
| P1R2 | 0 | / |
| P2R1 | 1 | 0.475 |
| P2R2 | 0 | / |
| P3R1 | 0 | / |
| P3R2 | 1 | 1.085 |
| P4R1 | 0 | / |
| P4R2 | 0 | / |
| P5R1 | 1 | 0.935 |
| P5R2 | 1 | 1.105 |

Figure 2:
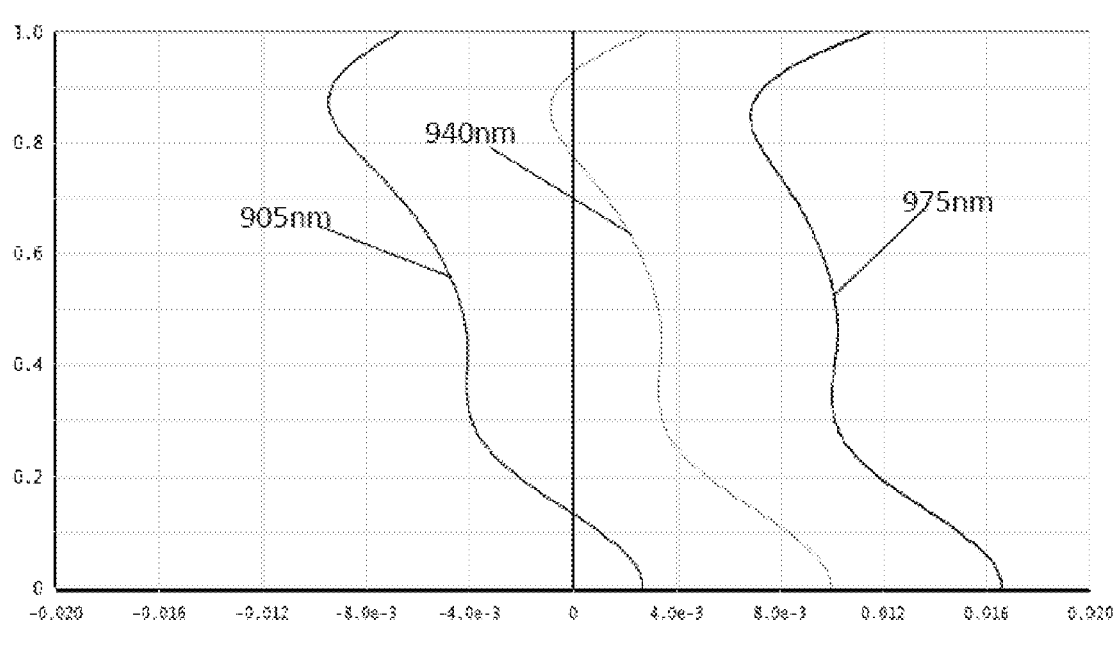
FIG. 2 is a schematic diagram of a longitudinal aberration of the camera optical lens shown in FIG. 1.
Figure 2:
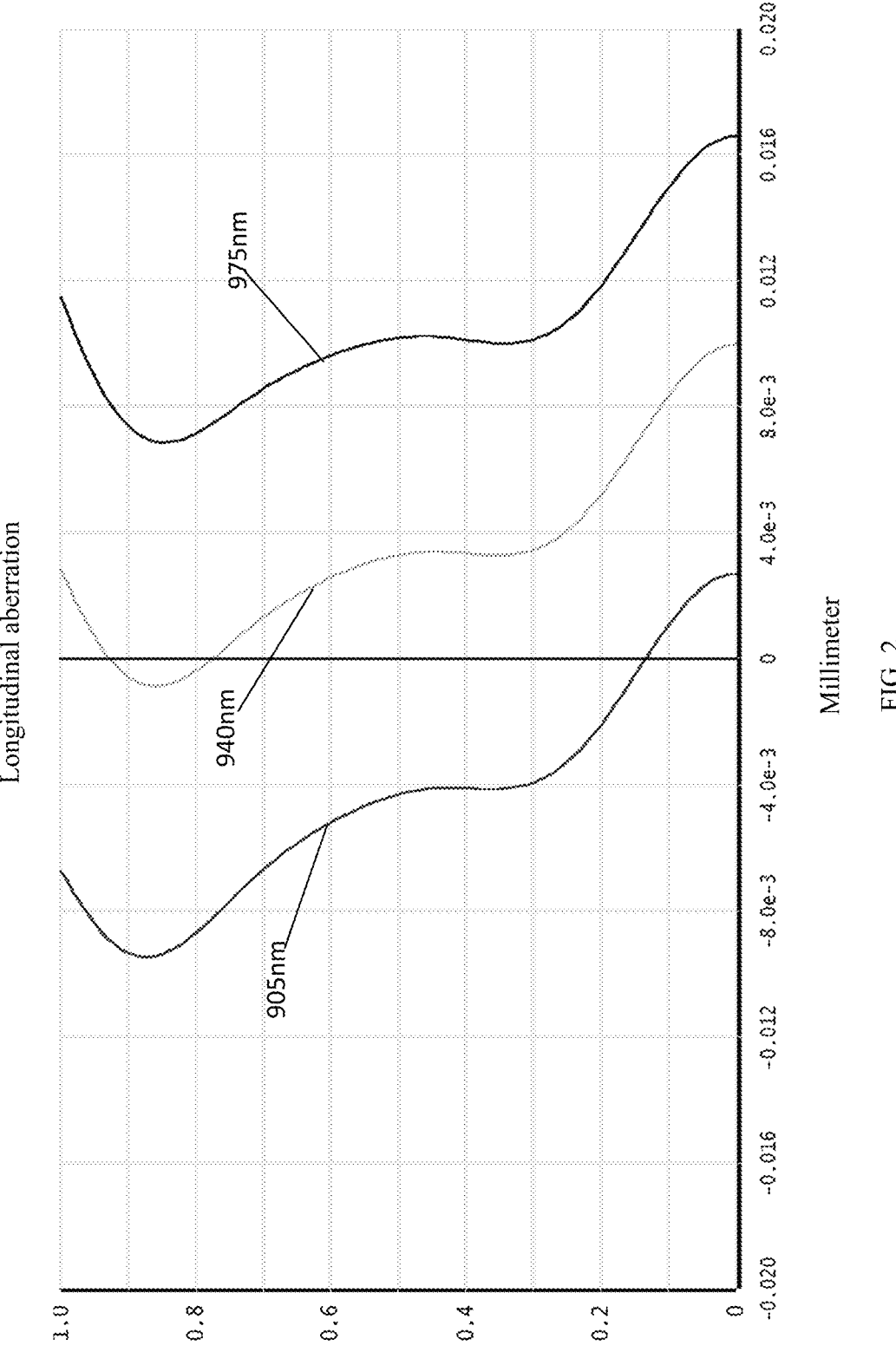
Figure 3:
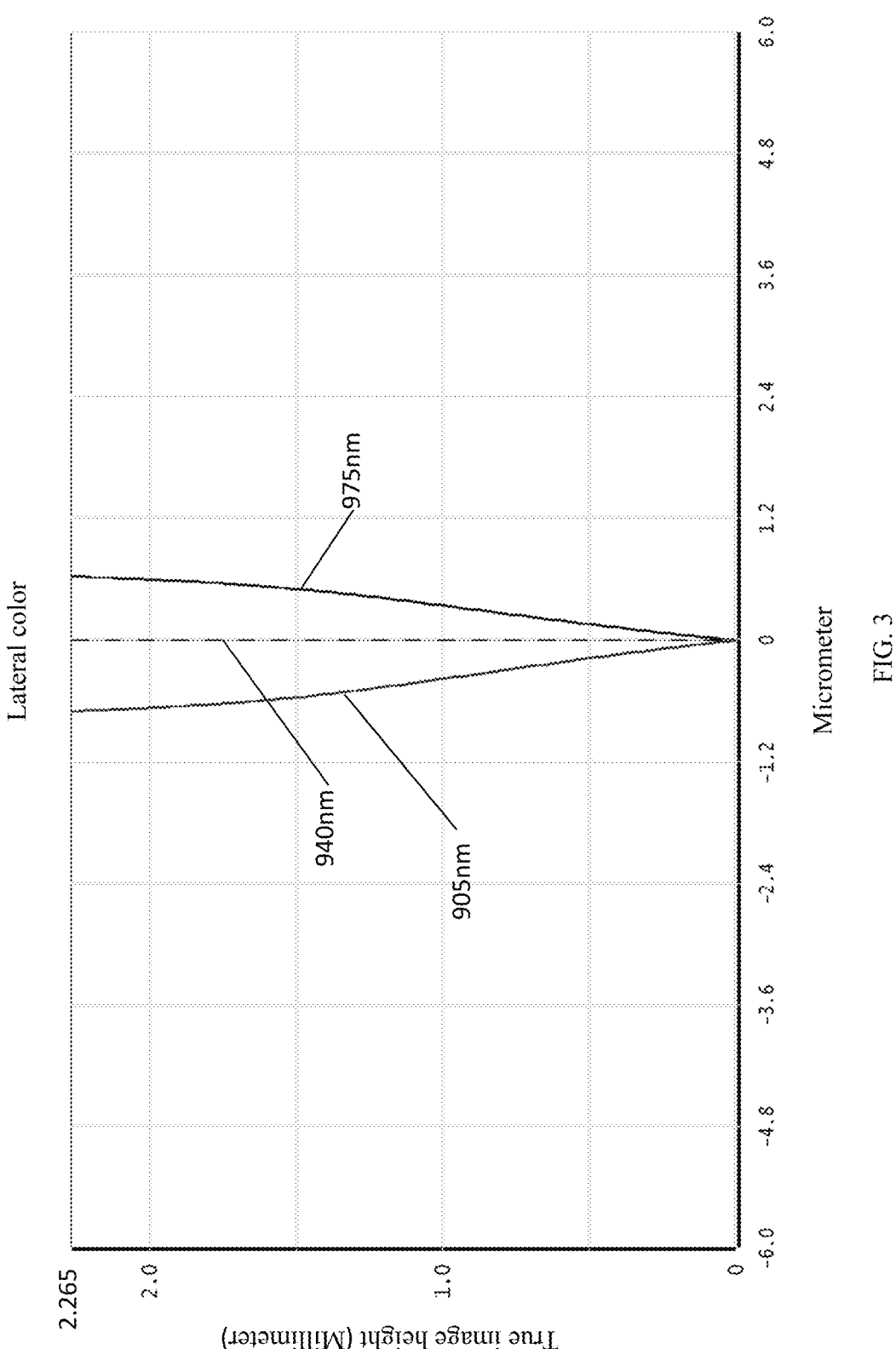
FIG. 3 is a schematic diagram of a lateral color of the camera optical lens shown in FIG. 1.
Figure 4:
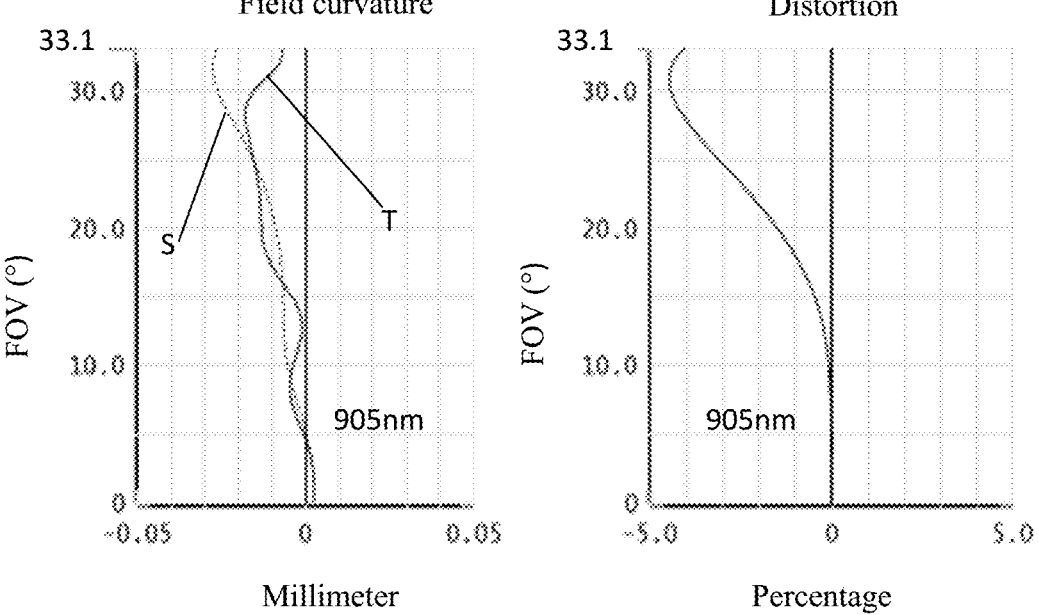
FIG. 4 is a schematic diagram of a field curvature and a distortion of the camera optical lens shown in FIG. 1.

FIG. 2 and FIG. 3 are schematic diagrams of a longitudinal aberration and a lateral color of the camera optical lens 10 after light having a wavelength of 905 nm, 940 nm and 975 nm passes through the camera optical lens 10 according to Embodiment 1, respectively. FIG. 4 is a schematic diagram of a field curvature and a distortion of the camera optical lens 10 after light having a wavelength of 905 nm passes through the camera optical lens 10 according to Embodiment 1. A field curvature S in FIG. 4 is a field curvature in a sagittal direction, and T is a field curvature in a meridian direction.

Subsequent Table 21 below shows numerical values corresponding to various numerical values in each Embodiment and parameters specified in the conditions.

As shown in Table 21, Embodiment 1 satisfies various conditions required.

In this embodiment, the camera optical lens 10 has an entrance pupil diameter ENPD of 1.643 mm, a full-field image height IH of 2.265 mm, and a field of view FOV of 66.19° in a diagonal direction. The camera optical lens 10 satisfies design requirements of large aperture, wide angle and ultra-thinness, and has on-axis and off-axis chromatic aberrations fully corrected, thereby having excellent optical performance.

Embodiment 2

Embodiment 2 is basically the same as Embodiment 1, and involves symbols having the same meanings as Embodiment 1, and only differences therebetween are listed below.

Figure 5:
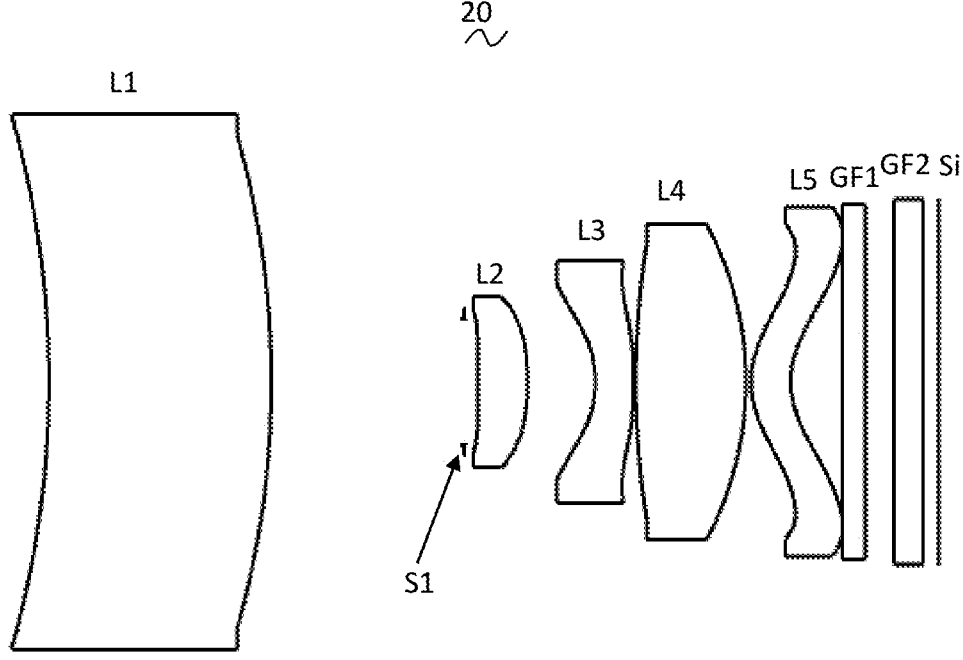
FIG. 5 is a structural schematic diagram of a camera optical lens according to Embodiment 2 of the present disclosure.

In this embodiment, the object-side surface of the first lens L1 is concave in the paraxial region, the image-side surface of the first lens L1 is convex in the paraxial region, and the object-side surface of the fourth lens L4 is convex in the paraxial region FIG. 5 shows a camera optical lens 20 according to Embodiment 2 of the present disclosure.

Table 5 and Table 6 show the design data of the camera optical lens 20 of the Embodiment 2 of the present disclosure.

TABLE 5

|  | R | d |  | nd |  | vd |
| --- | --- | --- | --- | --- | --- | --- |
| S1 | ∞ | d0= | −5.592 |  |  |  |
| R1 | −10.938 | d1= | 3.000 | nd1 | 2.2000 v1 | 17.01 |
| R2 | −10.220 | d2= | 2.779 |  |  |  |
| R3 | 17.006 | d3= | 0.673 | nd2 | 1.6613 v2 | 20.37 |
| R4 | −2.973 | d4= | 0.914 |  |  |  |
| R5 | −1.367 | d5= | 0.514 | nd3 | 1.6613 v3 | 20.37 |
| R6 | −9.617 | d6= | 0.035 |  |  |  |
| R7 | 10.131 | d7= | 1.482 | nd4 | 1.8348 v4 | 42.72 |
| R8 | −3.824 | d8= | 0.070 |  |  |  |
| R9 | 1.022 | d9= | 0.536 | nd5 | 1.5370 v5 | 55.99 |
| R10 | 1.022 | d10= | 0.700 |  |  |  |
| R11 | ∞ | d11= | 0.300 | ndg1 | 1.5233 vg1 | 54.52 |
| R12 | ∞ | d12= | 0.386 |  |  |  |
| R13 | ∞ | d13= | 0.400 | ndg2 | 1.5168 vg2 | 64.17 |
| R14 | ∞ | d14= | 0.212 |  |  |  |

Table 6 shows aspheric surface data of each lens in the camera optical lens 20 according to Embodiment 2 of the present disclosure.

TABLE 6

| | Conic coefficient | Aspheric coefficient | | | | |
| --- | --- | --- | --- | --- | --- | --- |
| | k | A4 | A6 | A8 | A10 | A12 |
| R3 | −1.4479E+01 | −9.1190E−02 | 5.5166E−02 | −6.9947E−01 | 2.8419E+00 | −7.4295E+00 |
| R4 | 5.3357E+00 | −8.8166E−02 | 4.5583E−02 | −2.1759E−01 | 6.3343E−01 | −1.1412E+00 |
| R5 | −2.4402E+00 | −3.4948E−01 | 5.0783E−01 | −6.3712E−01 | 1.0384E+00 | −1.2990E+00 |
| R6 | −1.3507E+02 | −2.8639E−01 | 4.3290E−01 | −4.8778E−01 | 4.8626E−01 | −3.5453E−01 |
| R9 | −1.7382E+00 | 8.8604E−03 | −5.5602E−02 | 1.1496E−03 | 1.9110E−02 | −1.0364E−02 |
| R10 | −1.0882E+00 | 3.6791E−03 | −1.6179E−01 | 1.2519E−01 | −5.3088E−02 | 1.3885E−02 |

| | Conic coefficient | Aspheric coefficient | | | |
| --- | --- | --- | --- | --- | --- |
| | k | A14 | A16 | A18 | A20 |
| R3 | −1.4479E+01 | 1.2026E+01 | −1.1792E+01 | 6.3159E+00 | −1.4055E+00 |
| R4 | 5.3357E+00 | 1.2578E+00 | −8.1352E−01 | 2.7216E−01 | −3.3212E−02 |
| R5 | −2.4402E+00 | 1.0330E+00 | −5.0129E−01 | 1.3700E−01 | −1.6254E−02 |
| R6 | −1.3507E+02 | 1.7222E−01 | −5.2859E−02 | 9.3018E−03 | −7.1539E−04 |
| R9 | −1.7382E+00 | 2.2226E−03 | −9.5783E−05 | −3.6871E−05 | 4.3757E−06 |
| R10 | −1.0882E+00 | −2.2330E−03 | 2.0066E−04 | −7.4727E−06 | −2.4895E−08 |

Design data of the inflection point and the arrest point of each lens in the camera optical lens 20 according to Embodiment 2 of the present disclosure are shown in Tables 7 and 8.

TABLE 7

| | Number of inflection points | Inflection point 1 |
|---|---|---|
| P1R1 | 0 | / |
| P1R2 | 0 | / |
| P2R1 | 1 | 0.235 |
| P2R2 | 0 | / |
| P3R1 | 1 | 0.865 |
| P3R2 | 1 | 0.845 |
| P4R1 | 0 | / |
| P4R2 | 0 | / |
| P5R1 | 1 | 0.855 |
| P5R2 | 1 | 0.875 |

TABLE 8

| | Number of arrest points | Arrest point 1 |
|---|---|---|
| P1R1 | 0 | / |
| P1R2 | 0 | / |
| P2R1 | 1 | 0.395 |
| P2R2 | 0 | / |
| P3R1 | 0 | / |
| P3R2 | 1 | 1.285 |
| P4R1 | 0 | / |
| P4R2 | 0 | / |
| P5R1 | 1 | 1.615 |
| P5R2 | 1 | 1.785 |

Figure 6:
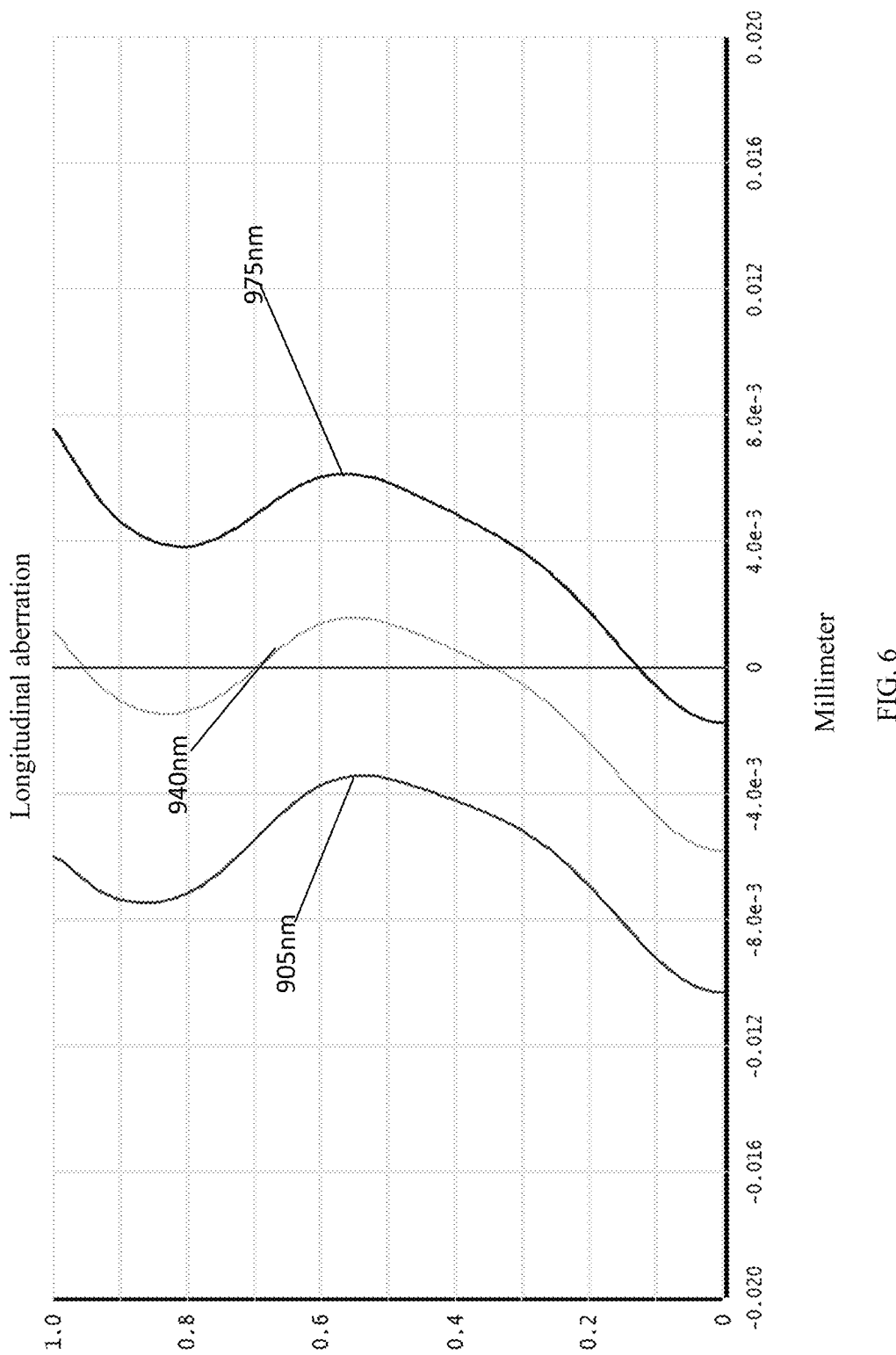
FIG. 6 is a schematic diagram of a longitudinal aberration of the camera optical lens shown in FIG. 5.
Figure 7:
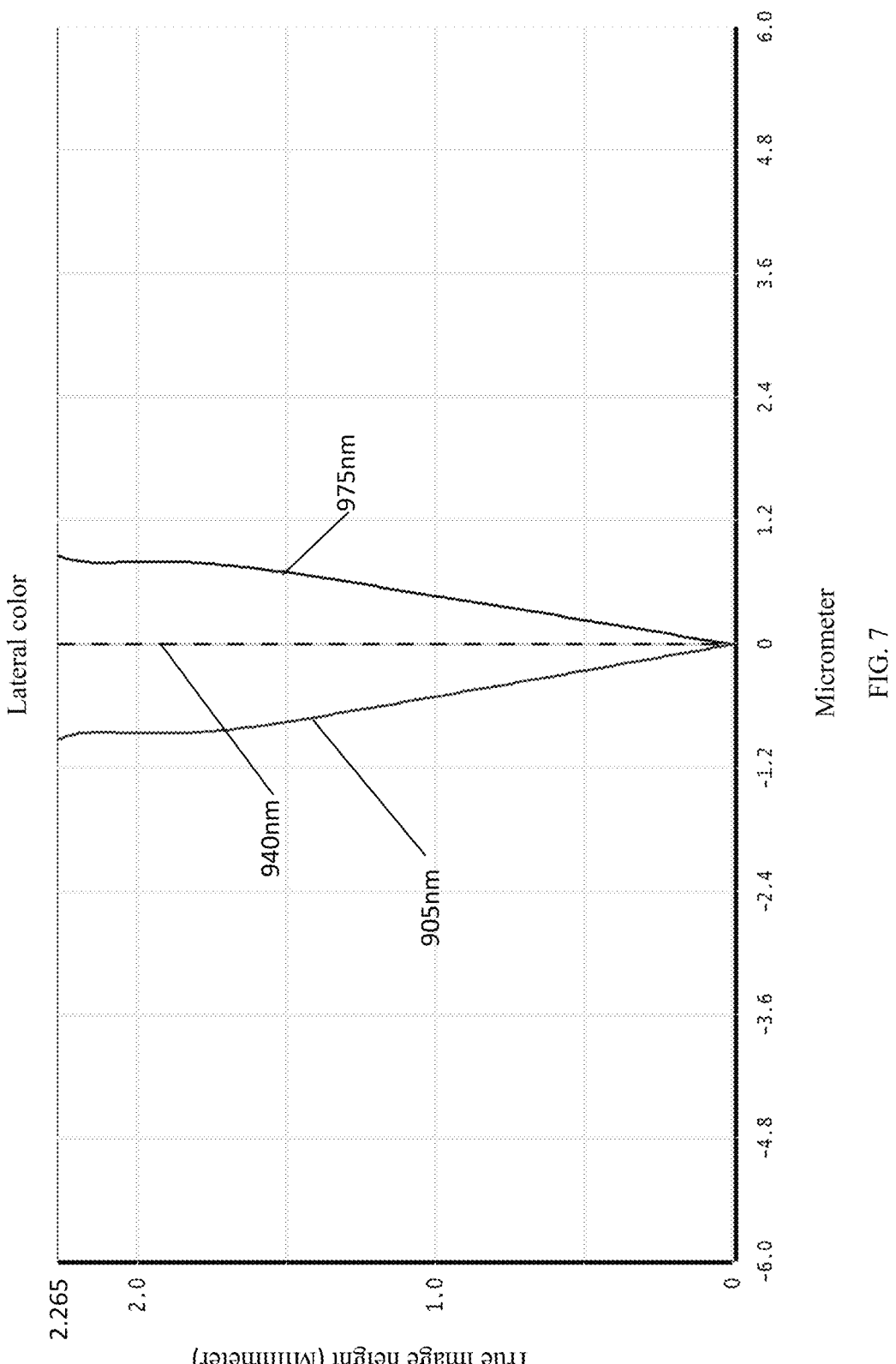
FIG. 7 is a schematic diagram of a lateral color of the camera optical lens shown in FIG. 5.
Figure 8:
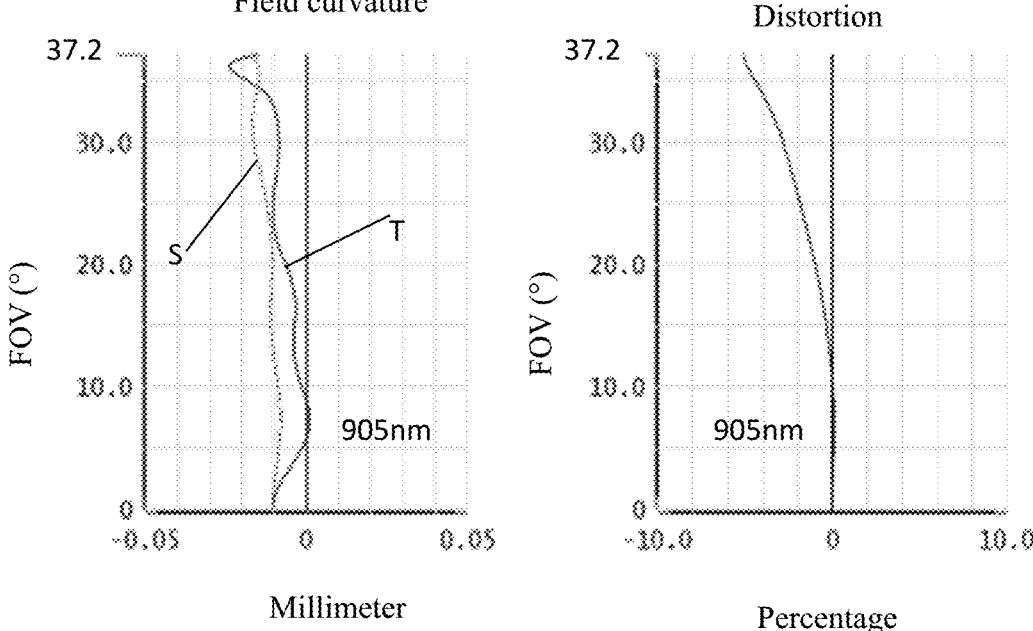
FIG. 8 is a schematic diagram of a field curvature and a distortion of the camera optical lens shown in FIG. 5.

FIG. 6 and FIG. 7 are schematic diagrams of a longitudinal aberration and a lateral color of the camera optical lens 20 after light having a wavelength of 905 nm, 940 nm and 975 nm passes through the camera optical lens 20 according to Embodiment 2, respectively. FIG. 8 is a schematic diagram of a field curvature and a distortion of the camera optical lens 20 after light having a wavelength of 905 nm passes through the camera optical lens 20 according to Embodiment 2. The field curvature S in FIG. 8 is a field curvature in a sagittal direction, and T is a field curvature in a meridian direction.

As shown in Table 21, Embodiment 2 satisfies various conditions required.

In this embodiment, the camera optical lens 20 has an entrance pupil diameter ENPD of 1.429 mm, a full-field image height IH of 2.265 mm, and a field of view FOV 74.32° in a diagonal direction. The camera optical lens 20 satisfies design requirements of large aperture, wide angle and ultra-thinness, and has on-axis and off-axis chromatic aberrations fully corrected, thereby having excellent optical performance.

Embodiment 3

Embodiment 3 is basically the same as Embodiment 1, and involves symbols having the same meanings as Embodiment 1, and only differences therebetween are listed below.

In this embodiment, the object-side surface of the fourth lens L4 is convex in the paraxial region. The fifth lens L5 has a negative refractive power.

Figure 9:
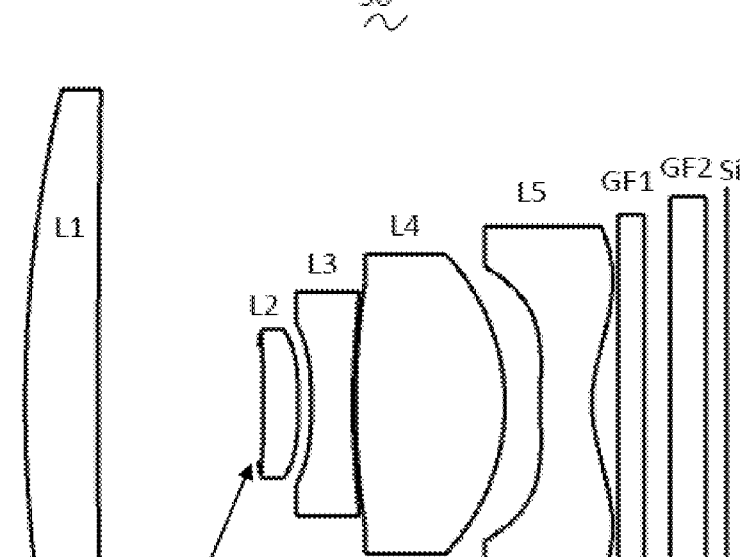
FIG. 9 is a structural schematic diagram of a camera optical lens according to Embodiment 3 of the present disclosure.

FIG. 9 shows a camera optical lens 30 according to Embodiment 3 of the present disclosure.

Table 9 and Table 10 show the design data of the camera optical lens 30 of the Embodiment 3 of the present disclosure.

TABLE 9

| | R | | d | | nd | | vd |
|---|---|---|---|---|---|---|---|
| S1 | ∞ | d0= | −2.686 | | | | |
| R1 | 14.725 | d1= | 0.836 | nd1 | 2.2000 | v1 | 17.01 |
| R2 | 217.268 | d2= | 1.893 | | | | |
| R3 | 1000000.000 | d3= | 0.400 | nd2 | 1.6613 | v2 | 20.37 |
| R4 | −5.707 | d4= | 0.150 | | | | |
| R5 | −6.077 | d5= | 0.473 | nd3 | 1.6613 | v3 | 20.37 |
| R6 | 6.112 | d6= | 0.035 | | | | |
| R7 | 8.475 | d7= | 1.709 | nd4 | 2.0389 | v4 | 22.75 |
| R8 | −2.370 | d8= | 0.408 | | | | |
| R9 | 7.469 | d9= | 0.591 | nd5 | 1.5370 | v5 | 55.99 |
| R10 | 1.494 | d10= | 0.300 | | | | |
| R11 | ∞ | d11= | 0.300 | ndg1 | 1.5233 | vg1 | 54.52 |
| R12 | ∞ | d12= | 0.300 | | | | |
| R13 | ∞ | d13= | 0.400 | ndg2 | 1.5168 | vg2 | 64.17 |
| R14 | ∞ | d14= | 0.241 | | | | |

Table 10 shows aspheric surface data of each lens in the camera optical lens 30 of the Embodiment 3 of the present disclosure.

TABLE 10

| | Conic coefficient | Aspheric coefficient | | | | |
|---|---|---|---|---|---|---|
| | k | A4 | A6 | A8 | A10 | A12 |
| R3 | 2.0000E+02 | −1.0862E−01 | 1.8352E−01 | −3.4832E+00 | 3.0807E+01 | −1.6547E+02 |
| R4 | 1.9695E+01 | −2.3337E−01 | 1.4559E−01 | −5.8439E−01 | 8.9422E−01 | 5.8050E+00 |
| R5 | 5.7368E+00 | −2.5350E−01 | 4.2207E−01 | −2.3693E+00 | 9.8612E+00 | −2.3661E+01 |
| R6 | −7.6909E+01 | −3.2049E−02 | 5.1016E−02 | −4.3686E−02 | 2.4745E−02 | 2.6675E−02 |
| R9 | −2.1039E+01 | −1.9209E−01 | 6.2076E−02 | −1.1034E−01 | 2.1157E−01 | −2.3938E−01 |
| R10 | −8.6949E−01 | −1.9741E−01 | 5.1232E−02 | 2.6037E−02 | −4.5733E−02 | 2.9649E−02 |

| | Conic coefficient | Aspheric coefficient | | | |
|---|---|---|---|---|---|
| | k | A14 | A16 | A18 | A20 |
| R3 | 2.0000E+02 | 5.4590E+02 | −1.0855E+03 | 1.1933E+03 | −5.5710E+02 |
| R4 | 1.9695E+01 | −3.4124E+01 | 7.5714E+01 | −7.9916E+01 | 3.3317E+01 |
| R5 | 5.7368E+00 | 3.1251E+01 | −1.8971E+01 | 3.3910E−01 | 3.4182E+00 |
| R6 | −7.6909E+01 | −9.8093E−02 | 1.0587E−01 | −5.1047E−02 | 9.4478E−03 |
| R9 | −2.1039E+01 | 1.5773E−01 | −6.0242E−02 | 1.2229E−02 | −1.0002E−03 |
| R10 | −8.6949E−01 | −1.1122E−02 | 2.5025E−03 | −3.1330E−04 | 1.6814E−05 |

Design data of the inflection point and the arrest point of each lens in the camera optical lens 30 according to Embodiment 3 of the present disclosure are shown in Tables 11 and 12.

TABLE 11

| | Number of inflection points | Inflection point 1 | Inflection point 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.865 | / |
| P3R2 | 2 | 1.035 | 1.055 |
| P4R1 | 0 | / | / |
| P4R2 | 0 | / | / |
| P5R1 | 1 | 0.245 | / |
| P5R2 | 1 | 0.645 | / |

TABLE 12

| | Number of arrest points | Arrest point 1 |
|---|---|---|
| P5R1 | 1 | 0.425 |
| P5R2 | 1 | 1.385 |

Figure 10:
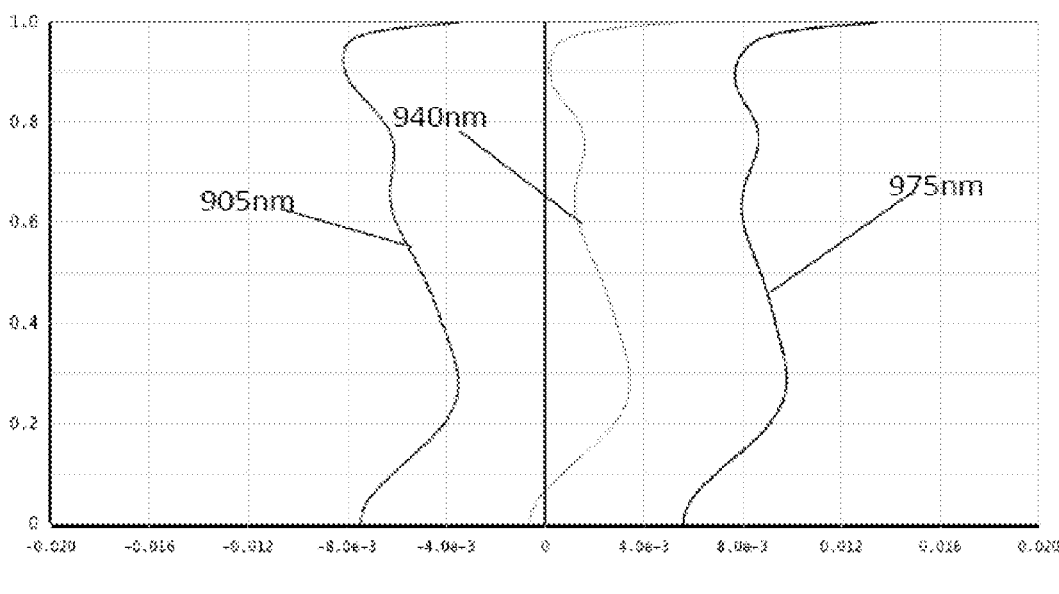
FIG. 10 is a schematic diagram of a longitudinal aberration of the camera optical lens shown in FIG. 9.
Figure 11:
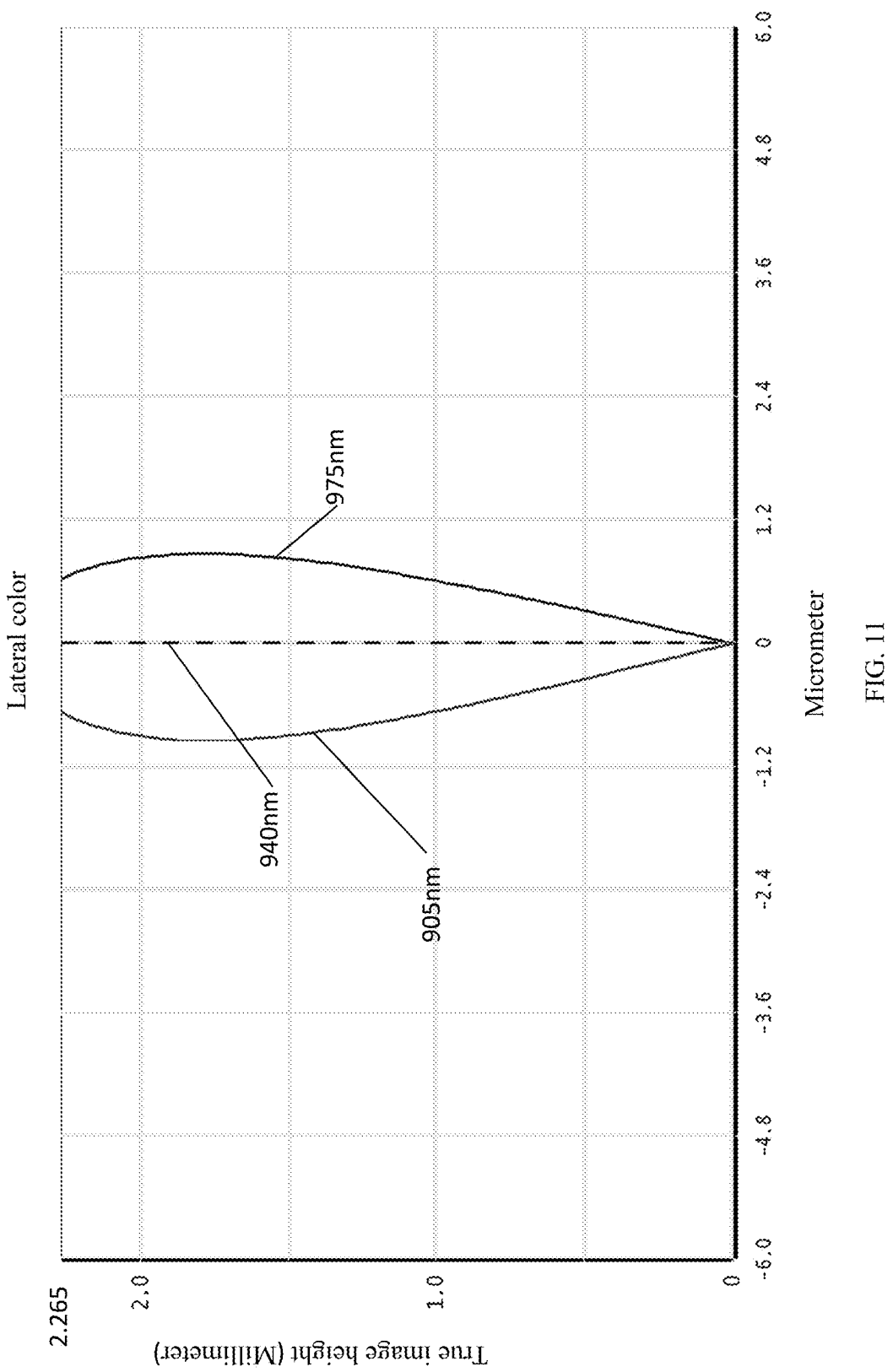
FIG. 11 is a schematic diagram of a lateral color of the camera optical lens shown in FIG. 9.
Figure 12:
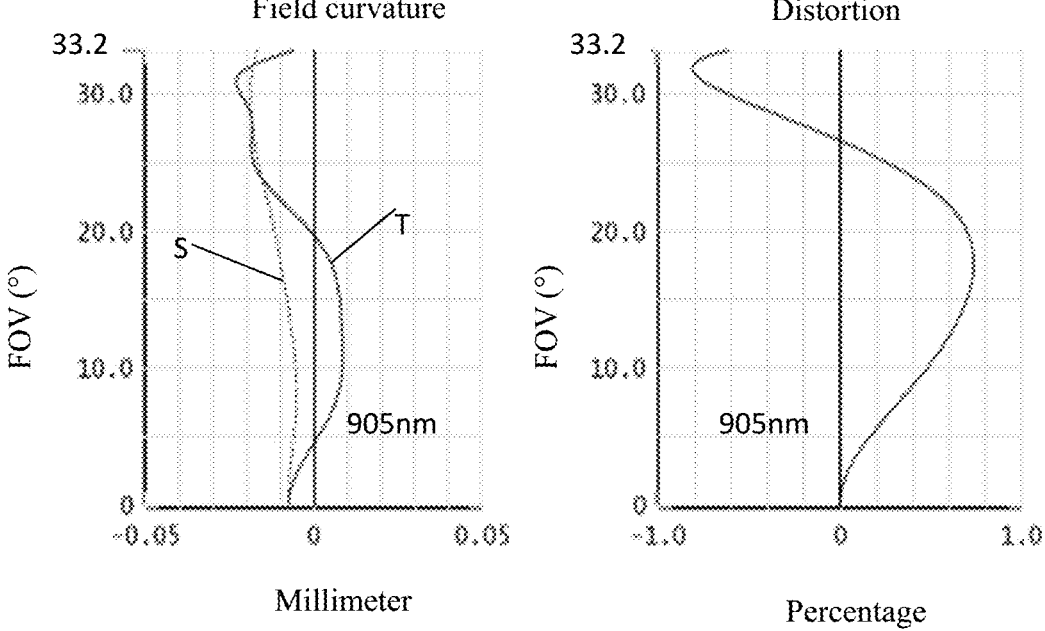
FIG. 12 is a schematic diagram of a field curvature and a distortion of the camera optical lens shown in FIG. 9.

FIG. 10 and FIG. 11 are schematic diagrams of a longitudinal aberration and a lateral color of the camera optical lens 30 after light having a wavelength of 905 nm, 940 nm and 975 nm passes through the camera optical lens 30 according to Embodiment 3, respectively. FIG. 12 is a schematic diagram of a field curvature and a distortion of the camera optical lens 30 after light having a wavelength of 905 nm passes through the camera optical lens 30 according to Embodiment 3. A field curvature S in FIG. 12 is a field curvature in a sagittal direction, and T is a field curvature in a meridian direction.

Table 21 below lists the corresponding values of each condition in this embodiment according to the above conditions. It can be appreciated that the camera optical lens 30 of this embodiment satisfies the above conditions.

In this embodiment, the camera optical lens 30 has an entrance pupil diameter ENPD of 1.577 mm, a full-field image height IH of 2.265 mm, and a field of view FOV 66.34° in a diagonal direction. The camera optical lens 30 satisfies design requirements of large aperture, wide angle and ultra-thinness, and has on-axis and off-axis chromatic aberrations fully corrected, thereby having excellent optical performance.

Embodiment 4

Embodiment 4 is basically the same as Embodiment 1, and involves symbols having the same meanings as Embodiment 1, and only differences therebetween are listed below.

In this embodiment, the object-side surface of the first lens L1 is concave in the paraxial region, the image-side surface of the first lens L1 is convex in the paraxial region, and the object-side surface of the fourth lens L4 is convex in the paraxial region.

Figure 13:
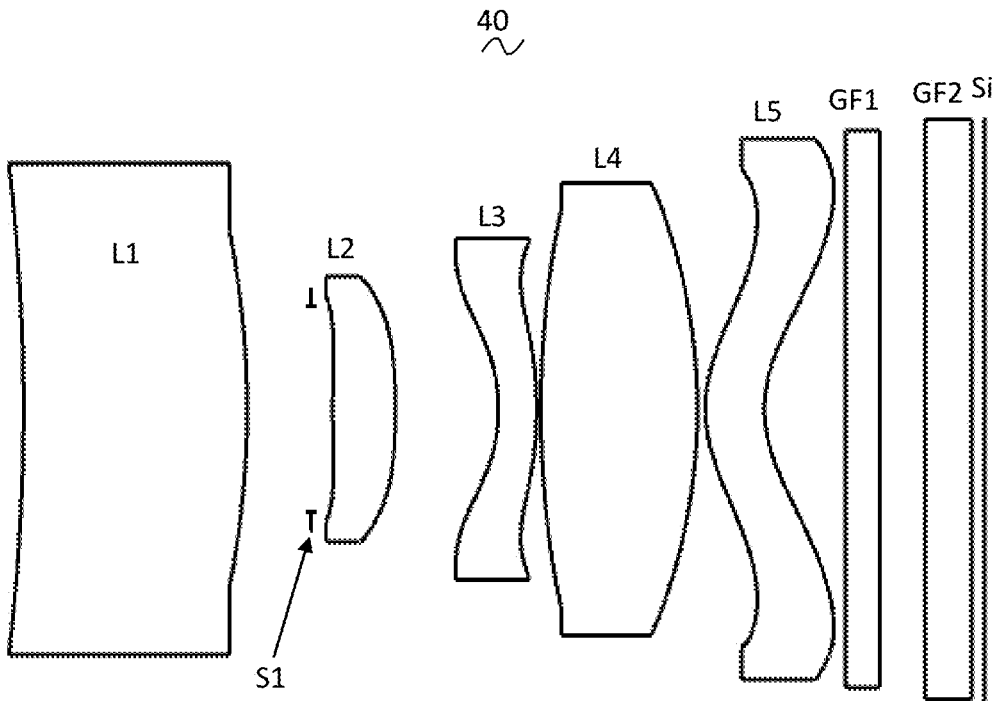
FIG. 13 is a structural schematic diagram of a camera optical lens according to Embodiment 4 of the present disclosure.

FIG. 13 shows a camera optical lens 40 according to Embodiment 4 of the present disclosure.

Table 13 and Table 14 show the design data of the camera optical lens 40 of the Embodiment 4 of the present disclosure.

TABLE 13

| | R | d | | nd | | vd | |
|---|---|---|---|---|---|---|---|
| S1 | ∞ | d0= | −2.483 | | | | |
| R1 | −14.093 | d1= | 1.930 | nd1 | 1.7000 | v1 | 48.11 |
| R2 | −6.293 | d2= | 0.740 | | | | |
| R3 | 9.729 | d3= | 0.540 | nd2 | 1.6613 | v2 | 20.37 |
| R4 | −4.865 | d4= | 0.890 | | | | |
| R5 | −1.239 | d5= | 0.330 | nd3 | 1.6613 | v3 | 20.37 |
| R6 | −3.347 | d6= | 0.035 | | | | |
| R7 | 6.934 | d7= | 1.351 | nd4 | 1.7000 | v4 | 48.11 |
| R8 | −4.106 | d8= | 0.070 | | | | |
| R9 | 0.992 | d9= | 0.509 | nd5 | 1.5370 | v5 | 55.99 |
| R10 | 0.898 | d10= | 0.700 | | | | |
| R11 | ∞ | d11= | 0.300 | ndg1 | 1.5233 | vg1 | 54.52 |
| R12 | ∞ | d12= | 0.386 | | | | |
| R13 | ∞ | d13= | 0.400 | ndg2 | 1.5168 | vg2 | 64.17 |
| R14 | ∞ | d14= | 0.111 | | | | |

Table 14 shows aspheric surface data of each lens in the camera optical lens 40 according to Embodiment 4 of the present disclosure.

TABLE 14

| | Conic coefficient | Aspheric coefficient | | | | |
|---|---|---|---|---|---|---|
| | k | A4 | A6 | A8 | A10 | A12 |
| R3 | −7.9887E+01 | −1.0106E−01 | −2.4931E−03 | −3.4378E−01 | 1.2059E+00 | −2.7939E+00 |
| R4 | 1.1811E+01 | −1.5019E−01 | 1.0337E−01 | −6.8573E−01 | 2.4916E+00 | −5.5126E+00 |
| R5 | −4.3935E+00 | −5.1137E−01 | 9.7337E−01 | −1.1510E+00 | 1.6496E+00 | −2.1399E+00 |
| R6 | −2.3657E+01 | −3.6187E−01 | 7.5384E−01 | −1.0284E+00 | 1.3672E+00 | −1.3800E+00 |
| R9 | −2.4415E+00 | 4.3577E−04 | −9.9729E−02 | 4.9451E−02 | 1.4450E−02 | −2.8384E−02 |
| R10 | −1.2981E+00 | −1.1497E−01 | −7.4562E−02 | 1.1991E−01 | −7.7203E−02 | 2.9332E−02 |

| | Conic coefficient | Aspheric coefficient | | | |
|---|---|---|---|---|---|
| | k | A14 | A16 | A18 | A20 |
| R3 | −7.9887E+01 | 4.0644E+00 | −3.8249E+00 | 2.2282E+00 | −6.3491E−01 |
| R4 | 1.1811E+01 | 7.5964E+00 | −6.3827E+00 | 2.9920E+00 | −6.0132E−01 |
| R5 | −4.3935E+00 | 1.8546E+00 | −9.7564E−01 | 2.8385E−01 | −3.5204E−02 |
| R6 | −2.3657E+01 | 9.2515E−01 | −3.8908E−01 | 9.3467E−02 | −9.8211E−03 |
| R9 | −2.4415E+00 | 1.4776E−02 | −3.9447E−03 | 5.4667E−04 | −3.1166E−05 |
| R10 | −1.2981E+00 | −6.9783E−03 | 1.0156E−03 | −8.2393E−05 | 2.8458E−06 |

Design data of the inflection point and the arrest point of each lens in the camera optical lens 40 according to Embodiment 4 of the present disclosure are shown in Tables 15 and 16.

TABLE 15

|  | Number of inflection points | Inflection point 1 |
|---|---|---|
| P1R1 | 0 | / |
| P1R2 | 0 | / |
| P2R1 | 1 | 0.275 |
| P2R2 | 0 | / |
| P3R1 | 1 | 0.685 |
| P3R2 | 1 | 0.665 |
| P4R1 | 0 | / |
| P4R2 | 0 | / |
| P5R1 | 1 | 0.735 |
| P5R2 | 1 | 0.775 |

TABLE 16

|  | Number of arrest points | Arrest point 1 |
|---|---|---|
| P1R1 | 0 | / |
| P1R2 | 0 | / |
| P2R1 | 1 | 0.455 |
| P2R2 | 0 | / |
| P3R1 | 1 | 1.205 |
| P3R2 | 1 | 0.995 |
| P4R1 | 0 | / |
| P4R2 | 0 | / |
| P5R1 | 1 | 1.485 |
| P5R2 | 1 | 1.695 |

Figure 14:
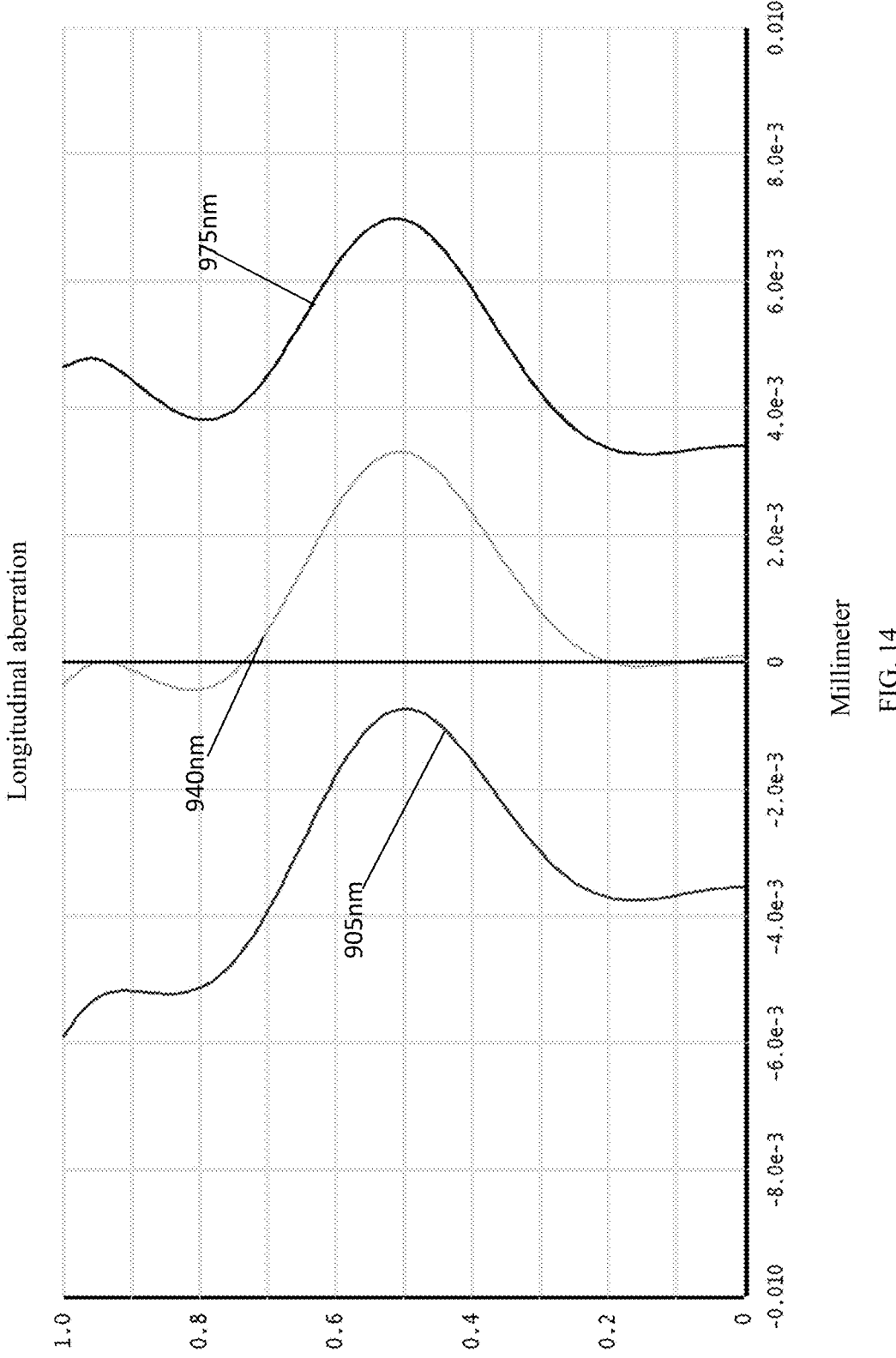
FIG. 14 is a schematic diagram of a longitudinal aberration of the camera optical lens shown in FIG. 13.
Figure 15:
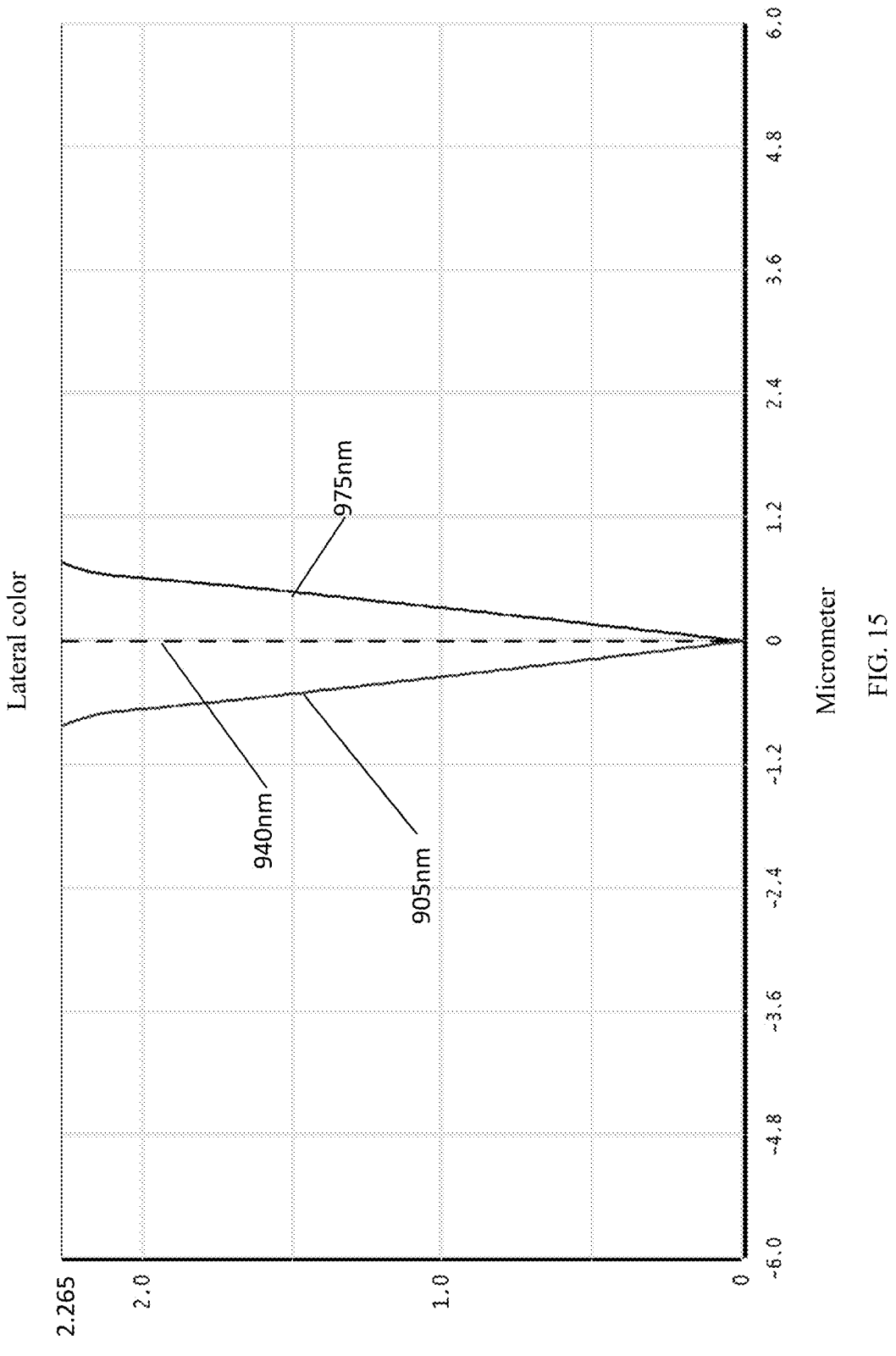
FIG. 15 is a schematic diagram of a lateral color of the camera optical lens shown in FIG. 13.
Figure 16:
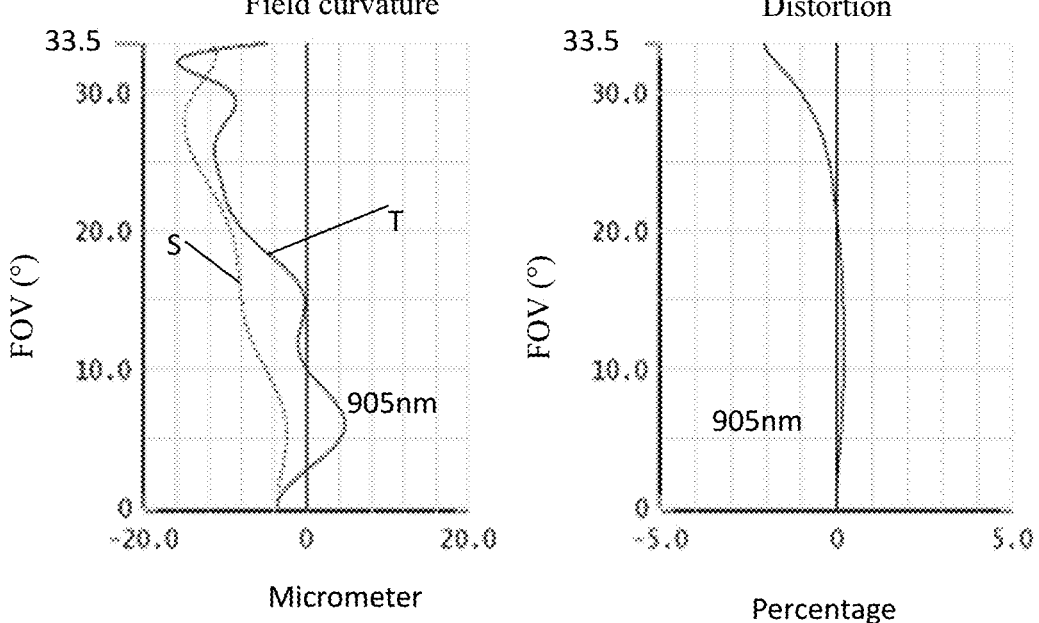
FIG. 16 is a schematic diagram of a field curvature and a distortion of the camera optical lens shown in FIG. 13.

FIG. 14 and FIG. 15 are schematic diagrams of a longitudinal aberration and a lateral color of the camera optical lens 40 after light having a wavelength of 905 nm, 940 nm and 975 nm passes through the camera optical lens 40 according to Embodiment 4, respectively. FIG. 16 is a schematic diagram of a field curvature and a distortion of the camera optical lens 40 after light having a wavelength of 905 nm passes through the camera optical lens 40 according to Embodiment 4. A field curvature S in FIG. 16 is a field curvature in a sagittal direction, and T is a field curvature in a meridian direction.

Table 21 below lists the corresponding values of each condition in this embodiment according to the above conditions. It can be appreciated that the camera optical lens 40 of this embodiment satisfies the above conditions.

In this embodiment, the camera optical lens 40 has an entrance pupil diameter ENPD of 1.582 mm, a full-field image height IH of 2.265 mm, and a field of view FOV 67.06° in a diagonal direction. The camera optical lens 40 satisfies design requirements of large aperture, wide angle and ultra-thinness, and has on-axis and off-axis chromatic aberrations fully corrected, thereby having excellent optical performance.

Comparative Embodiment

Comparative Embodiment involves symbols having the same meanings as Embodiment 1, and only differences therebetween are listed below.

In this Comparative Embodiment, the object-side surface of the first lens L1 is concave in the paraxial region, the image-side surface of the first lens L1 is convex in the paraxial region, and the object-side surface of the fourth lens L4 is convex in the paraxial region. The first lens L1 is made of a plastic material.

Figure 17:
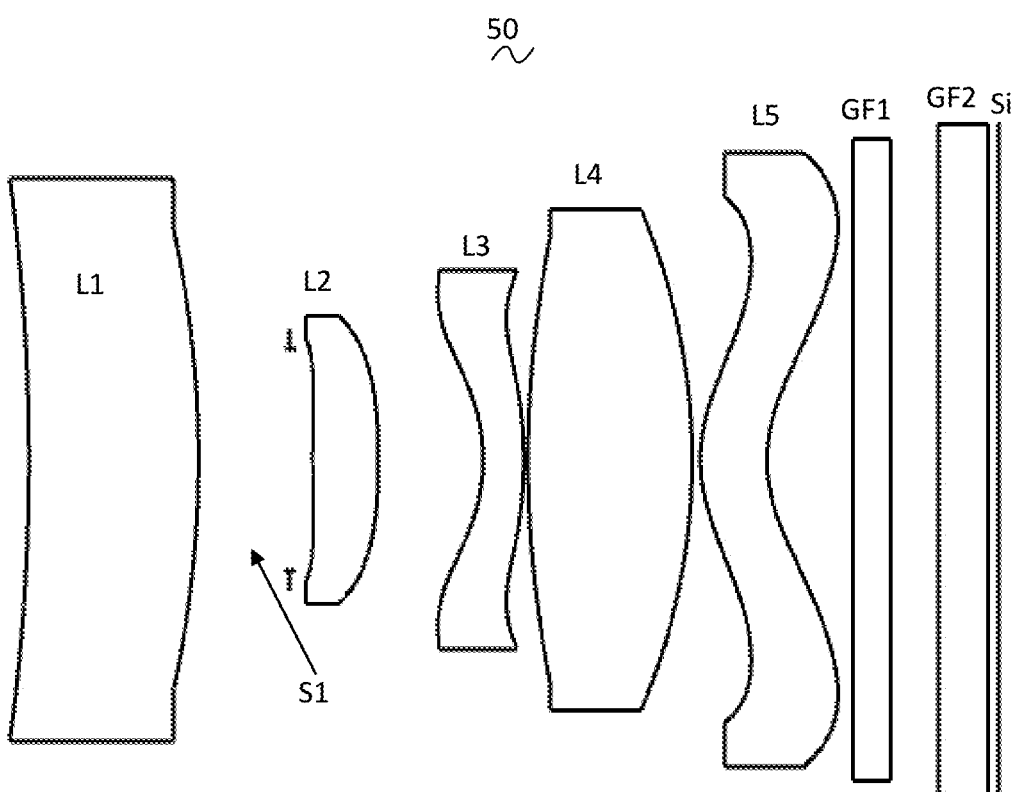
FIG. 17 is a structural schematic diagram of a camera optical lens according to Comparative Embodiment.

FIG. 17 shows a camera optical lens 50 according to Comparative Embodiment.

Table 17 and Table 18 show the design data of the camera optical lens 50 of the Comparative Embodiment.

TABLE 17

|  | R |  | d | nd |  | vd |  |
|---|---|---|---|---|---|---|---|
| S1 | ∞ | d0= | −2.113 |  |  |  |  |
| R1 | −13.286 | d1= | 1.373 | nd1 | 1.6700 | v1 | 19.39 |
| R2 | −6.688 | d2= | 0.923 |  |  |  |  |
| R3 | 8.957 | d3= | 0.531 | nd2 | 1.6613 | v2 | 20.37 |
| R4 | −4.479 | d4= | 0.846 |  |  |  |  |
| R5 | −1.264 | d5= | 0.330 | nd3 | 1.6613 | v3 | 20.37 |
| R6 | −3.513 | d6= | 0.035 |  |  |  |  |
| R7 | 7.031 | d7= | 1.325 | nd4 | 1.7000 | v4 | 48.11 |
| R8 | −4.044 | d8= | 0.070 |  |  |  |  |
| R9 | 1.010 | d9= | 0.535 | nd5 | 1.5370 | v5 | 55.99 |
| R10 | 0.905 | d10= | 0.700 |  |  |  |  |
| R11 | ∞ | d11= | 0.300 | ndg1 | 1.5233 | vg1 | 54.52 |
| R12 | ∞ | d12= | 0.386 |  |  |  |  |
| R13 | ∞ | d13= | 0.400 | ndg2 | 1.5168 | vg2 | 64.17 |
| R14 | ∞ | d14= | 0.090 |  |  |  |  |

Table 18 shows aspheric surface data of each lens in the camera optical lens 50 according to Comparative Embodiment.

TABLE 18

| | Conic coefficient | Aspheric coefficient | | | | |
|---|---|---|---|---|---|---|
| | k | A4 | A6 | A8 | A10 | A12 |
| R3 | −1.0892E+02 | −9.5817E−02 | −2.5028E−02 | −2.6916E−01 | 7.4719E−01 | −1.0452E+00 |
| R4 | 1.2334E+01 | −1.5029E−01 | 1.0557E−01 | −7.2914E−01 | 2.7105E+00 | −6.1403E+00 |
| R5 | −4.3405E+00 | −5.1868E−01 | 9.8555E−01 | −1.2274E+00 | 1.9205E+00 | −2.5894E+00 |
| R6 | −2.0420E+01 | −3.6507E−01 | 7.6360E−01 | −1.0758E+00 | 1.4794E+00 | −1.5232E+00 |
| R9 | −2.4655E+00 | −1.4352E−02 | −8.6591E−02 | 3.2357E−02 | 3.4211E−02 | −4.3421E−02 |
| R10 | −1.3241E+00 | −1.1746E−01 | −7.4832E−02 | 1.2525E−01 | −8.2963E−02 | 3.2384E−02 |

| | Conic coefficient | Aspheric coefficient | | | |
|---|---|---|---|---|---|
| | k | A14 | A16 | A18 | A20 |
| R3 | −1.0892E+02 | −1.2773E−01 | 2.1345E+00 | −2.3674E+00 | 8.3941E−01 |
| R4 | 1.2334E+01 | 8.6672E+00 | −7.4581E+00 | 3.5775E+00 | −7.3486E−01 |
| R5 | −4.3405E+00 | 2.2695E+00 | −1.1975E+00 | 3.4857E−01 | −4.3221E−02 |
| R6 | −2.0420E+01 | 1.0350E+00 | −4.4104E−01 | 1.0760E−01 | −1.1518E−02 |

TABLE 18-continued

| R9 | −2.4655E+00 | 2.1792E−02 | −5.8858E−03 | 8.3805E−04 | −4.9452E−05 |
|---|---|---|---|---|---|
| R10 | −1.3241E+00 | −7.9164E−03 | 1.1848E−03 | −9.8997E−05 | 3.5305E−06 |

Design data of the inflection point and the arrest point of each lens in the camera optical lens 50 according to Comparative Embodiment are shown in Tables 19 and 20.

TABLE 19

|  | Number of inflection points | Inflection point 1 |
|---|---|---|
| P1R1 | 0 | / |
| P1R2 | 0 | / |
| P2R1 | 1 | 0.285 |
| P2R2 | 0 | / |
| P3R1 | 1 | 0.685 |
| P3R2 | 1 | 0.675 |
| P4R1 | 0 | / |
| P4R2 | 0 | / |
| P5R1 | 1 | 0.715 |
| P5R2 | 1 | 0.765 |

TABLE 20

|  | Number of arrest points | Arrest point 1 |
|---|---|---|
| P1R1 | 0 | / |
| P1R2 | 0 | / |
| P2R1 | 1 | 0.465 |
| P2R2 | 0 | / |
| P3R1 | 1 | 1.175 |
| P3R2 | 1 | 1.005 |
| P4R1 | 0 | / |
| P4R2 | 0 | / |

TABLE 20-continued

|  | Number of arrest points | Arrest point 1 |
|---|---|---|
| P5R1 | 1 | 1.425 |
| P5R2 | 1 | 1.665 |

Figure 18:
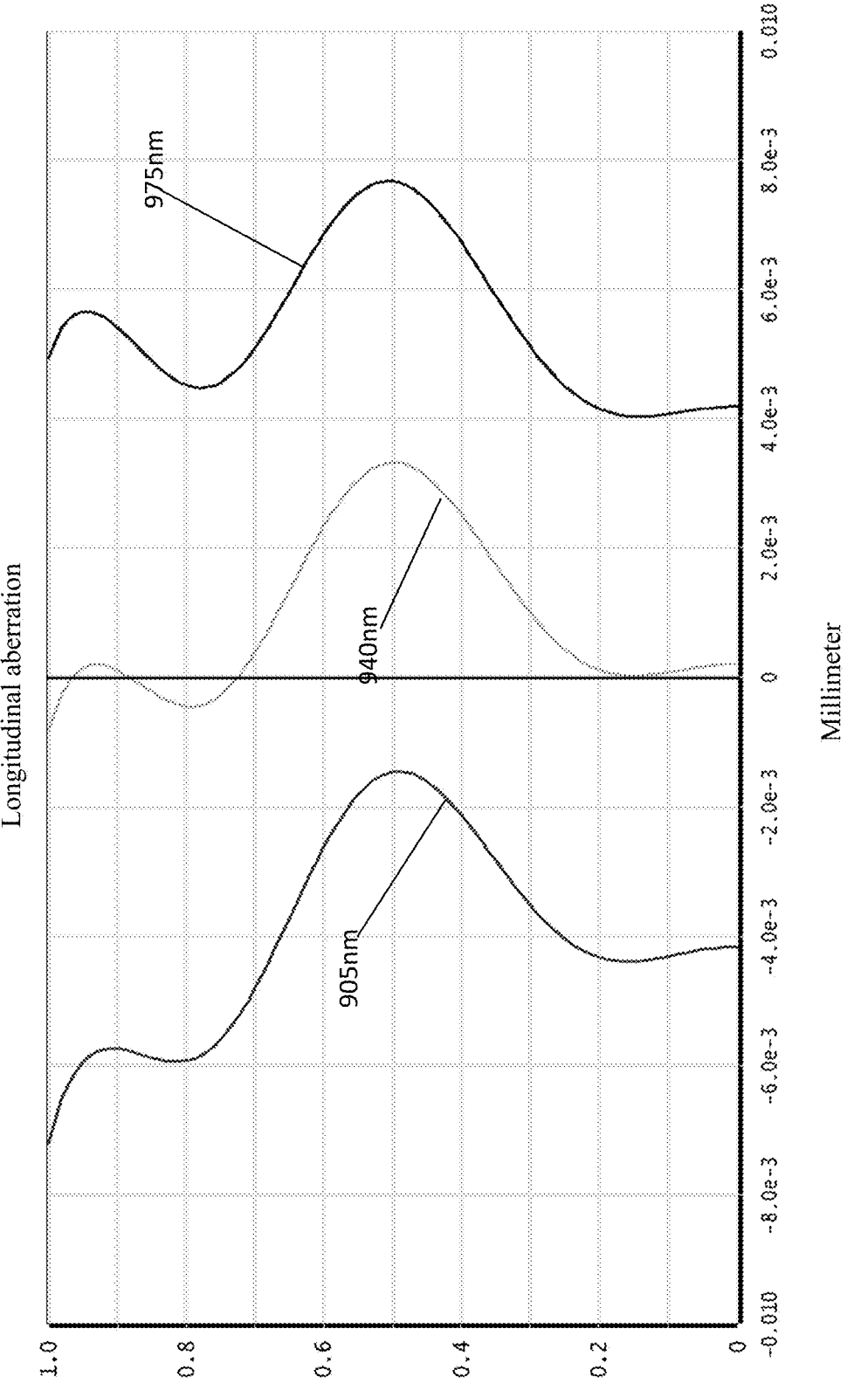
FIG. 18 is a schematic diagram of a longitudinal aberration of the camera optical lens shown in FIG. 17.
Figure 19:
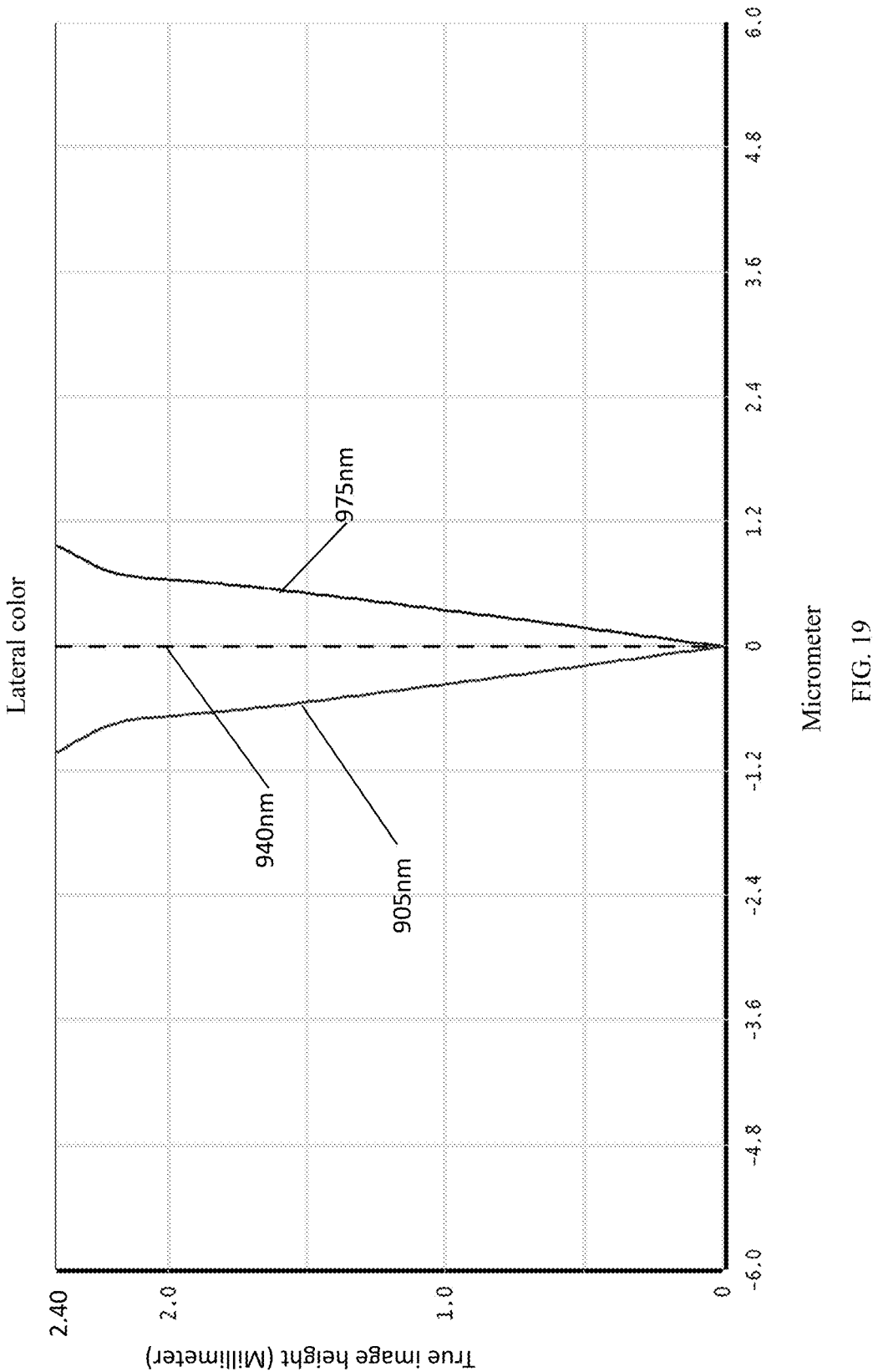
FIG. 19 is a schematic diagram of a lateral color of the camera optical lens shown in FIG. 17.
Figure 20:
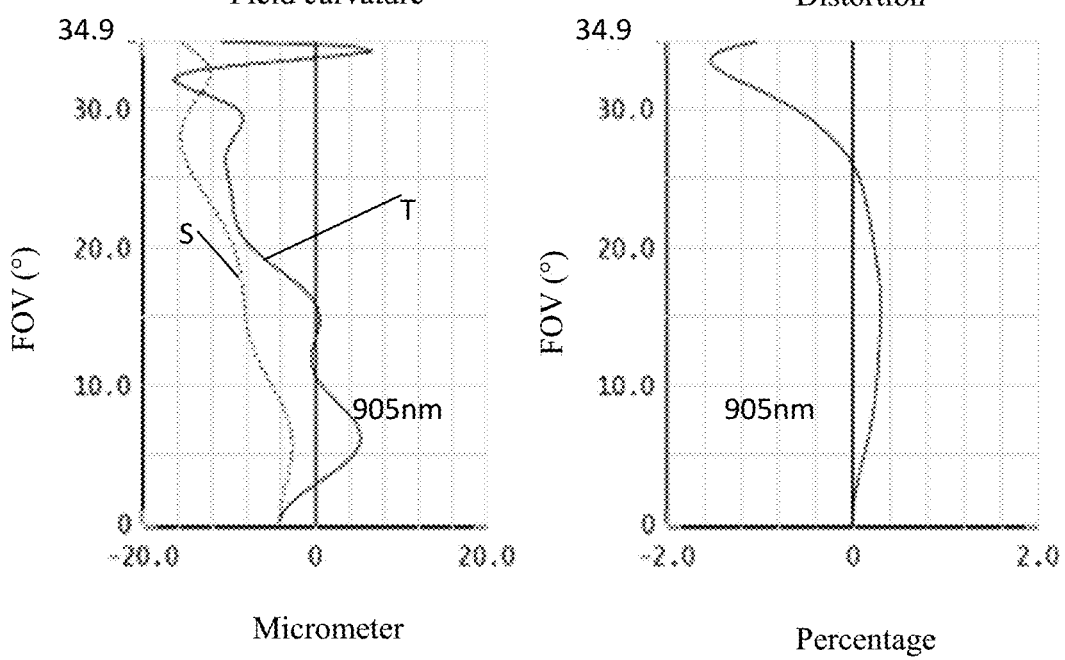
FIG. 20 is a schematic diagram of a field curvature and a distortion of the camera optical lens shown in FIG. 17.

FIG. 18 and FIG. 19 are schematic diagrams of a longitudinal aberration and a lateral color of the camera optical lens 50 after light having a wavelength of 905 nm, 940 nm and 975 nm passes through the camera optical lens 50 according to Comparative Embodiment, respectively. FIG. 20 is a schematic diagram of a field curvature and a distortion of the camera optical lens 50 after light having a wavelength of 905 nm passes through the camera optical lens 50 according to Comparative Embodiment. A field curvature S in FIG. 20 is a field curvature in a sagittal direction, and T is a field curvature in a meridian direction.

Table 21 below shows numerical values corresponding to various numerical values in Comparative Embodiment and parameters specified in the conditions. In the camera optical lens 50 of the Comparative Embodiment, the first lens is a plastic lens having a small operating temperature range.

In Comparative Embodiment, the camera optical lens 50 has an entrance pupil diameter ENPD of 1.576 mm, a full-field image height IH of 2.265 mm, and a field of view FOV of 69.80° in a diagonal direction. The on-axis and off-axis chromatic aberrations of the camera optical lens 50 are not fully corrected.

TABLE 21

| Parameters and conditions | Embodiment 1 | Embodiment 2 | Embodiment 3 | Embodiment 4 | Comparative Embodiment |
|---|---|---|---|---|---|
| Operating temperature range | −40° C. to 105° C. | −40° C. to 105° C. | −40° C. to 105° C. | −40° C. to 105° C. | 20° C. |
| TTL/f | 1.501 | 4.000 | 2.197 | 2.305 | 2.305 |
| n1 | 2.150 | 2.200 | 2.142 | 1.700 | 1.672 |
| R3/R4 | −2.000 | −5.721 | −175211.000 | −2.000 | −2.000 |
| n4 | 2.150 | 1.835 | 2.039 | 1.700 | 1.700 |
| (R9 + R10)/(R9 − R10) | 1019.280 | 2400000.000 | 1.500 | 18.213 | 18.213 |
| \|f3/d5\| | 10.00 | 5.01 | 10.00 | 10.00 | 10.00 |
| Operating wavelength | 905~975 nm | 905~975 nm | 905~975 nm | 905~975 nm | 905~975 nm |
| f | 3.614 | 3.144 | 3.469 | 3.480 | 3.468 |
| f1 | 4.581 | 42.321 | 13.822 | 15.058 | 19.390 |
| f2 | 10.441 | 4.036 | 8.985 | 5.180 | 4.774 |
| f3 | −4.735 | −2.572 | −4.726 | −3.297 | −3.297 |
| f4 | 8.044 | 3.572 | 2.012 | 3.955 | 3.934 |
| f5 | 15.721 | 10.672 | −3.660 | 20.524 | 21.671 |
| FNO | 2.200 | 2.200 | 2.200 | 2.200 | 2.200 |
| TTL | 5.420 | 12.000 | 8.040 | 8.290 | 7.480 |
| IH | 2.265 | 2.265 | 2.265 | 2.265 | 2.265 |
| FOV | 66.19 | 74.32 | 66.34 | 67.06 | 69.80 |

The above are only preferred embodiments of the present disclosure. Here, it should be noted that those skilled in the art may make modifications without departing from the inventive concept of the present disclosure, but these shall fall into the protection scope of the present disclosure.

What is claimed is:

1. A camera optical lens, comprising from an object side to an image side:

a first lens having positive refractive power;

a second lens having positive refractive power;

a third lens having negative refractive power; an object-side surface of the third lens is concave in a paraxial region, and an image-side surface of the third lens is convex in a paraxial region;

a fourth lens having positive refractive power; and a fifth lens having refractive power;

wherein the first lens is made of a glass material, and at least one of the second lens, the third lens, the fourth lens, and the fifth lens is made of a glass material;

a working temperature of the camera optical lens ranges from −40° C. to 105° C.;

the camera optical lens satisfies following conditions:

$$1.50 \le TTL/f \le 4.00;$$

$$-2.72 \le f3/f \le -0.55;$$

$$-5.60 \le (R5+R6)/(R5-R6) \le 0;$$

$$0.02 \le d5/TTL \le 0.13,$$

$$1.70 \le n1 \le 2.20; \text{ and}$$

$$R3/R4 \le -2.00,$$

where f denotes a focal length of the camera optical lens;

TTL denotes a total optical length from an object-side surface of the first lens to an image plane of the camera optical lens along an optic axis;

f3 denotes a focal length of the third lens;

R5 denotes a central curvature radius of an object-side surface of the third lens;

R6 denotes a central curvature radius of an image-side surface of the third lens;

d5 denotes an on-thickness of the third lens;

n1 denotes a refractive index of the first lens;

R3 denotes a central curvature radius of an object-side surface of the second lens, and R4 denotes a central curvature radius of an image-side surface of the second lens.

2. The camera optical lens as described in claim 1, wherein the camera optical lens satisfies a following condition:

$$1.70 \le n4 \le 2.20,$$

where n4 denotes a refractive index of the fourth lens.

3. The camera optical lens as described in claim 1, wherein the camera optical lens satisfies a following condition:

$$(R9+R10)/(R9-R10) \ge 1.50,$$

where

R9 denotes a central curvature radius of an object-side surface of the fifth lens, and R10 denotes a central curvature radius of an image-side surface of the fifth lens.

4. The camera optical lens as described in claim 1, wherein the camera optical lens satisfies a following condition:

$$5.00 \le |f3/d5| \le 10.00,$$

where f3 denotes a focal length of the third lens; and d5 denotes an on-axis thickness of the third lens.

5. The camera optical lens as described in claim 1, wherein a working wavelength of the camera optical lens ranges from 905 nm to 975 nm.

6. The camera optical lens as described in claim 1, wherein the camera optical lens satisfies following conditions:

$$0.63 \le f1/f \le 20.19;$$

$$-7.72 \le (R1+R2)/(R1-R2) \le 44.20; \text{ and}$$

$$0.05 \le d1/TTL \le 0.38,$$

where f1 denotes a focal length of the first lens,

R1 denotes a central curvature radius of an object-side surface of the first lens;

R2 denotes a central curvature radius of an image-side surface of the first lens; and d1 denotes an on-axis thickness of the first lens.

7. The camera optical lens as described in claim 1, wherein an object-side surface of the second lens is convex in a paraxial region, and an image-side surface of the second lens is convex in a paraxial region; and the camera optical lens satisfies following conditions:

$$0.64 \le f2/f \le 4.33; \text{ and}$$

$$0.02 \le d3/TTL \le 0.11,$$

where f2 denotes a focal length of the second lens; and d3 denotes an on-axis thickness of the second lens.

8. The camera optical lens as described in claim 1, wherein an image-side surface of the fourth lens is convex in a paraxial region;

the camera optical lens satisfies following conditions:

$$0.29 \le f4/f \le 3.34;$$

$$0.13 \le (R7+R8)/(R7-R8) \le 4.78; \text{ and}$$

$$0.06 \le d7/TTL \le 0.32,$$

where f4 denotes a focal length of the fourth lens;

R7 denotes a central curvature radius of an object-side surface of the fourth lens;

R8 denotes a central curvature radius of an image-side surface of the fourth lens; and d7 denotes an on-axis thickness of the fourth lens.

9. The camera optical lens as described in claim 1, wherein an object-side surface of the fifth lens is convex in a paraxial region, and an image-side surface of the fifth lens is concave in the paraxial region;

the camera optical lens satisfies following conditions:

$$-2.11 \le f5/f \le 8.85; \text{ and}$$

$$0.02 \le d9/TTL \le 0.19,$$

where
f5 denotes a focal length of the fifth lens; and
d9 denotes an on-axis thickness of the fifth lens.

* * * * *